Oct. 4, 1966 R. HOLT 3,276,184

MACHINE FOR WRAPPING ARTICLES AND LOAVES OF SLICED BREAD IN LIMP FILM WRAPPER SHEETS

Filed Sept. 11, 1963 7 Sheets-Sheet 1

INVENTOR.
Ronald Holt

BY Otto A. Earl

ATTORNEY

Oct. 4, 1966 R. HOLT 3,276,184

MACHINE FOR WRAPPING ARTICLES AND LOAVES OF SLICED BREAD IN LIMP FILM WRAPPER SHEETS

Filed Sept. 11, 1963 7 Sheets-Sheet 2

INVENTOR.
Ronald Holt

BY

Otto A. Earl

ATTORNEY.

Oct. 4, 1966 R. HOLT 3,276,184

MACHINE FOR WRAPPING ARTICLES AND LOAVES OF SLICED BREAD IN LIMP FILM WRAPPER SHEETS

Filed Sept. 11, 1963 7 Sheets-Sheet 3

INVENTOR.
Ronald Holt

BY [signature]

ATTORNEY

INVENTOR.
Ronald Holt
BY Otto A. Earl
ATTORNEY

INVENTOR.
Ronald Holt
BY Otis A. Earl
ATTORNEY

INVENTOR.
Ronald Holt

BY [signature]

ATTORNEY.

INVENTOR.
Ronald Holt
BY Otto A. Earl
ATTORNEY

3,276,184
MACHINE FOR WRAPPING ARTICLES AND LOAVES OF SLICED BREAD IN LIMP FILM WRAPPER SHEETS

Ronald Holt, Battle Creek, Mich., assignor to Battle Creek Packaging Machines, Inc., Battle Creek, Mich.
Filed Sept. 11, 1963, Ser. No. 308,185
35 Claims. (Cl. 53—209)

This invention relates to improvements in machine for wrapping articles and loaves of sliced bread in limp film wrapper sheets. The principal objects of this invention are:

First, to provide a wrapping machine which will operate at a higher rate of sped than was theretofore possible for wrapping sliced bread.

Second, to provide a wrapping machine which maintains continuous positive advancing and slice retaining control of loaves of bread as the loaves are delivered rapidly from a slicing machine and while the loaves are wrapped in a wrapper sheet of limp film material.

Third, to provide a novel form of wrapping machine in which the sliced loaf of bread is deposited on the leading end of a wrapper sheet and the loaf and sheet are thereafter advanced concurrently and the trailing portion of the sheet swung upwardly and over the top and front of the advancing loaf and thereafter folded under the leading edge of the loaf and tucked or folded inwardly at the ends of the wrapper to form the completed package.

Fourth, to provide a novel form of wrapper sheet cutting and advancing mechanism and a novel form coacting sheet and loaf receiving conveyor for simultaneously receiving a sheet of wrapping material and a loaf of sliced bread for thereafter forming the wrapper sheet into a complete tube around the sliced loaf as the loaf and wrapper are advanced and without losing control of the slices of the loaf or permitting the sliced loaf to collapse.

Fifth, to provide a novel form of loaf and wrapper sheet advancing conveyor having vacuum means and mechanical gripper means for picking up and advancing successive wrapper sheets, and loaf retaining fingers for holding the slices of a sliced loaf erect while the wrapper sheet is wrapped around the loaf and for releasing and retracting the sheet grippers and the slice retaining fingers as other end fold forming elements become operative to fold the ends of the wrapper and retain the slices of the loaf.

Sixth, to provide a novel form of wrapper sheet pickup and gripper mechanism together with slice retaining fingers on a wrapping conveyor which are readily adjustable laterally of the conveyor to accommodate loaves of different length while retaining fully operative engagement and relation to the pickup and finger actuating mechanism.

Seventh, to provide a novel form of bread wrapping conveyor in which suction ports associated with each loaf advancing plate pickup and feed the leading end of a limp wrapper sheet film at the longitudinal midsection of the loaf advancing plates to that the slices of the loaf may be retained by foldable fingers positioned ahead of the wrapper sheet and so that the suction or vacuum developed at the suction ports can be cut off automatically as soon as the wrapper sheet is received and retained in position to reduce the amount of vacuum or suction power required by the machine.

Eighth, to provide a novel form of transfer mechanism for transferring loaves of sliced bread partially wrapped in a tubular wrapper of limp sheet material to an end fold forming and sealing mechanism that will complete the tubular fold of the wrapper sheet along the bottom side of the loaf and assume endwise retaining engagement with the slices of the loaf as the loaf and wrapper leave the wrapping conveyor.

Ninth, to provide a novel form of wrapper sheet cutting and delivery mechanism for delivering sheets of limp film material into a position where their leading ends may be picked up and advanced by suction ports and vacuum chambers carried by a continuously operating wrapping conveyor.

Tenth, to provide a novel form of wrapping conveyor in which a foldover bar is swingably supported initially at the trailing side of a loaf on the conveyor and swung in an upward and forward arc over the loaf to the forward side of the loaf as the loaf and bar are advanced by the conveyor so that the loaf and wrapper sheet are under continuous control and in continuous motion as the loaf and wrapper are advanced.

Other objects and advantages of the invention will be apparent from a consideration of the following description and claims. Many of the objects and advantages are useful and obtained in wrapping articles other than bread in wrapper sheets of other than limp film material. The drawings, of which there are seven sheets, illustrate a highly practical form of the invention.

Figure 1:
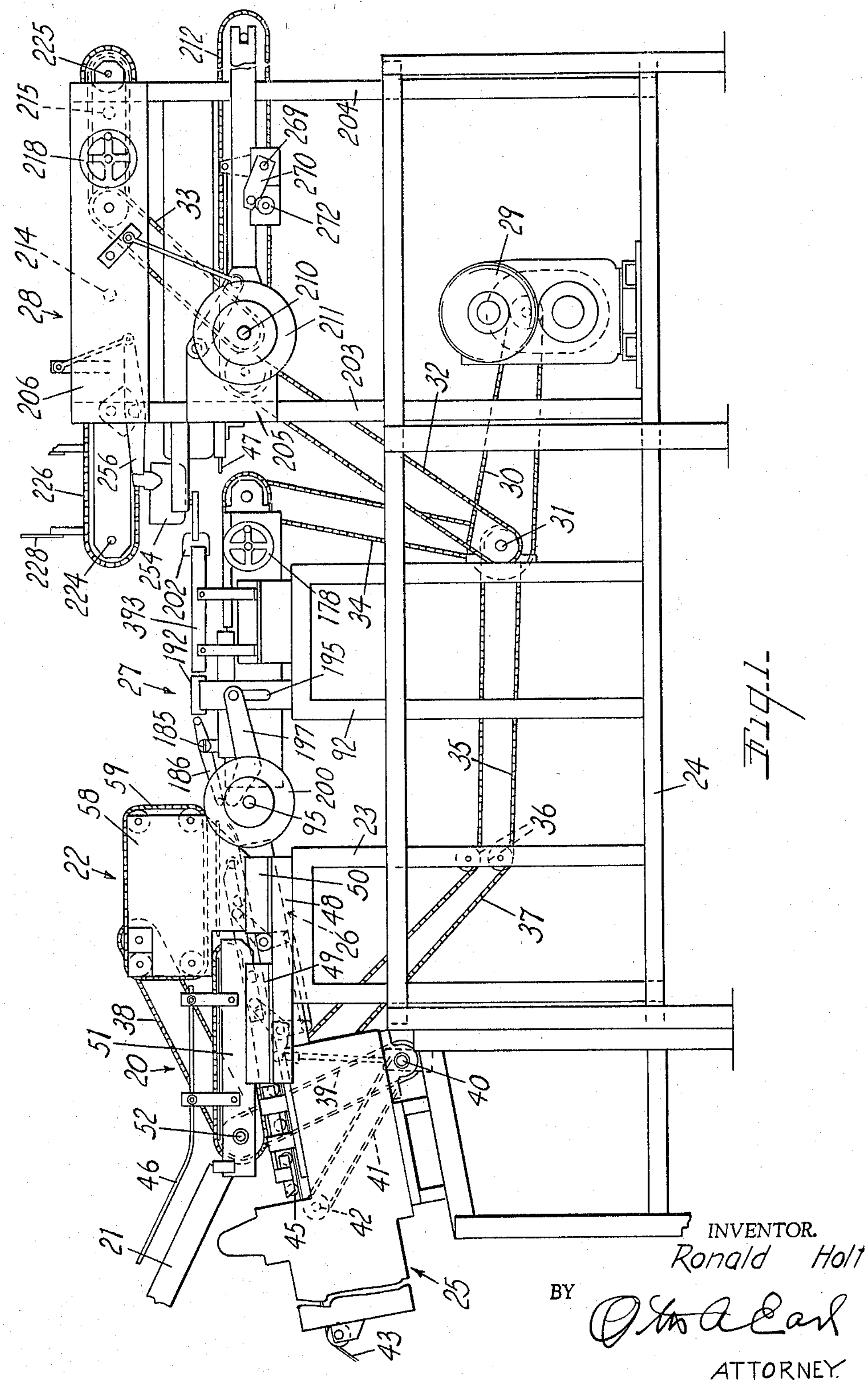
FIG. 1 is a fragmentary side elevational view of the assembled wrapping machine in general outline and with many details omitted.

The wrapping machine of the invention as a whole as shown in FIG. 1 consists of a receiving conveyor indicated generally at 20 and adapted to receive loaves of sliced bread directly from the off-feeding conveyor 21 of a bread slicing machine. The receiving conveyor assembly includes at its leading or discharge end an overhead transfer conveyor indicated generally at 22 and other parts which will be described in greater detail presently. The subassembly of the receiving conveyor 20 and the forwarding conveyor 22 are mounted on a first pedestal or upright 23 of a suitable frame work 24.

Figure 5:
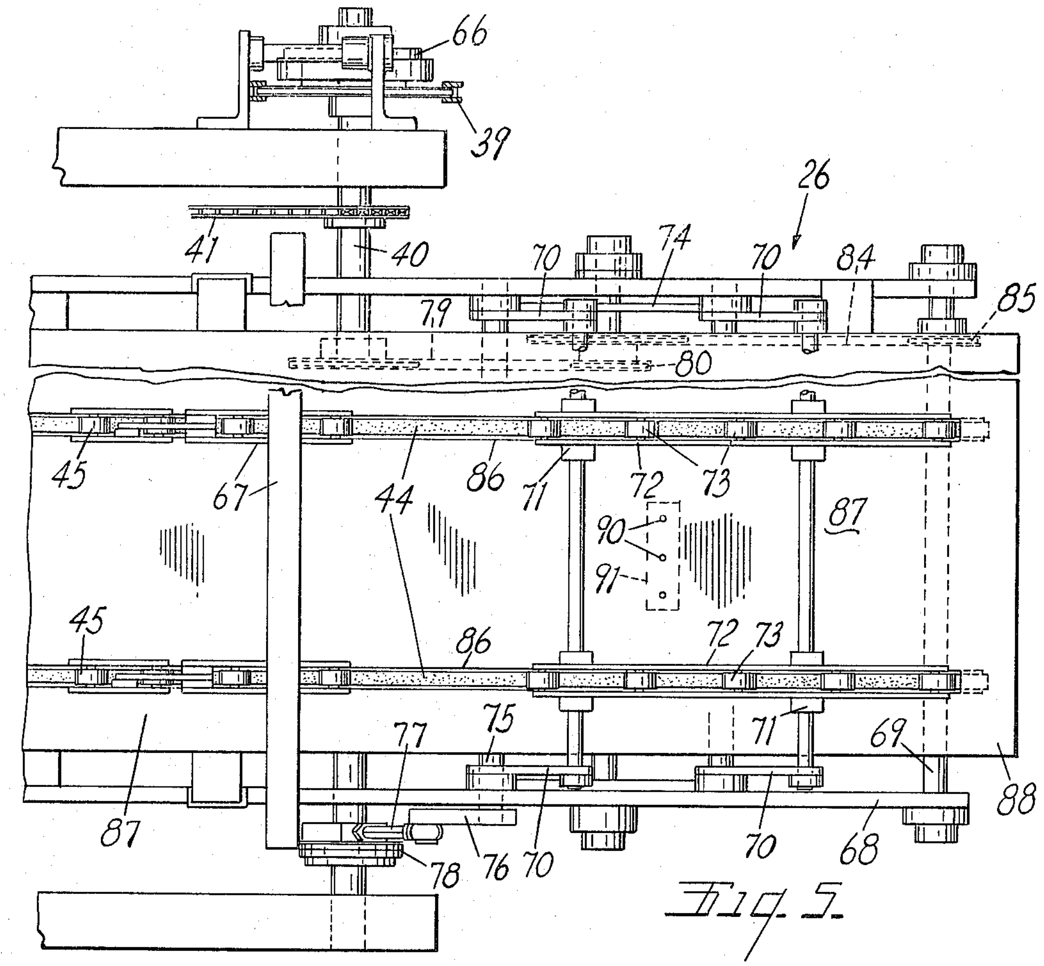
FIG. 5 is a fragmentary top plan view of the wrapper sheet delivery means shown in FIG. 4.
Figure 4:
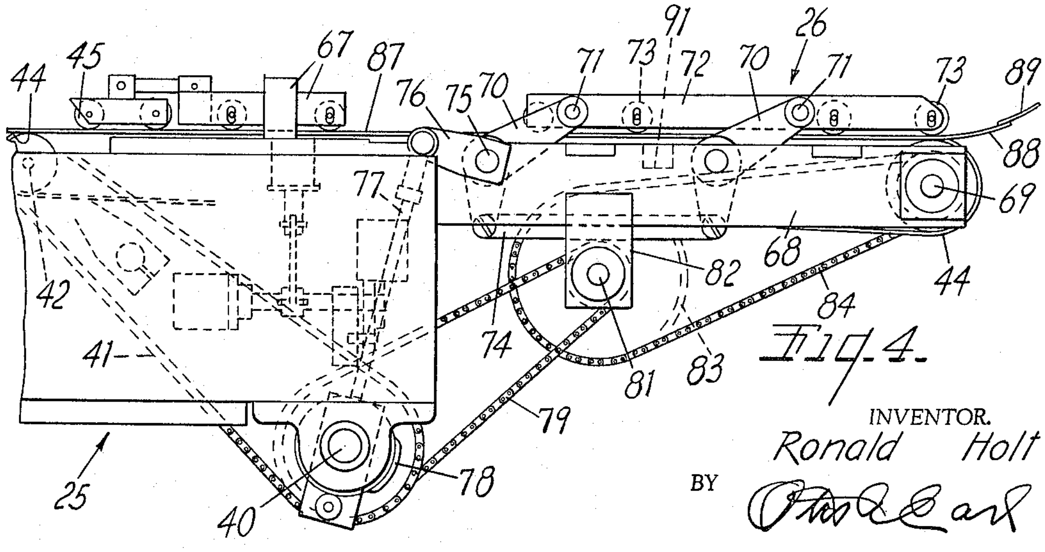
FIG. 4 is an enlarged fragmentary side elevational view of the wrapper sheet feed mechanism for delivering wrapper sheets to the wrapping conveyor.

Positioned underneath the receiving conveyor and mounted in upwardly and forwardly inclined direction relative to the movement of the bread is a wrapper web feed and cut off assembly indicated generally by the numeral 25. The wrapper feed and cut off structure which is shown in greater detail in FIGS. 4 and 5 includes a sheet delivery and locating conveyor, indicated generally by the numeral 26, which projects upwardly at an incline underneath the transfer conveyor assembly 22. Both the wrapper sheets delivered by the delivery conveyor 26 and the loaves of sliced bread delivered by the transfer conveyor 22 are received by and picked up on the wrapping conveyor indicated generally by the numeral 27. After passing part way through the wrapping conveyor 27, the loaves of partially wrapped bread are acted upon by the end flap folding mechanism of an end folder and sealing conveyor assembly indicated generally by the numeral 28.

*Drive train and sequence of operation*

The wrapping machine and its several components are driven by a motor 29 through suitable gear reduction mechanism to the chain 30 and cross shaft 31 in FIG. 1. An upwardly and forwardly inclined chain 32 drives the end flap folding and sealing mechanism with a further chain 33 extending upwardly and driving the overhead forwarding or feeding conveyor for advancing loaves through the sealing steps. A chain 34 extends upwardly from the shaft 31 and drives the front end of the wrapping conveyor 27. A rearwardly extending chain 35 guided under the guide sprockets 36 and upwardly as at 37 drives the receiving conveyor 21 while a further chain 38 driven from receiving conveyor drives the overhead transfer or forwarding conveyor 22. Another chain 39 from the receiving end of the receiving conveyor drives the wrapper web feeding and cutting mechanism through the shaft indicated conventionally at 40 with a further chain 41 extending upwardly to the shaft 42 which drives the sheet delivery as will be more completely described. The web of wrapping material which is desirably of the limp synthetic polyolefin type is drawn in as at 43 into the wrapper web feeding and cutting assembly 25. This sheet cutting and forwarding mechanism is of old and well known design and so is not disclosed or described in greater detail. Belts 44 receive the incoming web of wrapper material and the web and sheets cut therefrom and are held in sheet advancing engagement with the belts by weight pressed follower rolls 45. This advances the leading end of the web beyond the feed rolls and cut-off knives (not illustrated) and thereafter advances the individual sheets after they have been severed from the leading end of the web. The web feed and cut-off operates continuously as long as bread is available at the conveyor 20.

It will be understood that the several drive connections operate in timed relation to the delivery of sliced loaves of bread from the slicer delivery 21. The loaves are released intermittently but rapidly along the delivery 21 and the receiving conveyor 20 operates with sufficient speed to receive each successive loaf in spaced relation. Guard or retaining rails 64 adjustably mounted on the receiving conveyor keep the slices upright and the loaves in compact position until transferred to the overhead transfer conveyor 22. As noted, a single wrapper sheet and loaf of bread arrive in timed relation to the rear or infeeding end of the wrapping conveyor 27. The loaf of bread with its slices retained in upright position as will be described is deposited on the leading edge of the wrapper sheet and advanced along the wrapping conveyor. Foldover bars associated with each flight of the wrapping conveyor then swing in an arc to lift the trailing portion of the wrapper sheet upwardly along the back side of each loaf and over the top and down along the front or leading side of the loaf. After the end flap folding elements of the end folding and sealing structure 28 have assumed control of the ends of the loaves and the wrapper, the loaves are transferred by the transfer plate 47 to the end fold wrapping and sealing assembly as will be described.

*Receiving and transferring conveyor assembly*

Figures 2, 3:
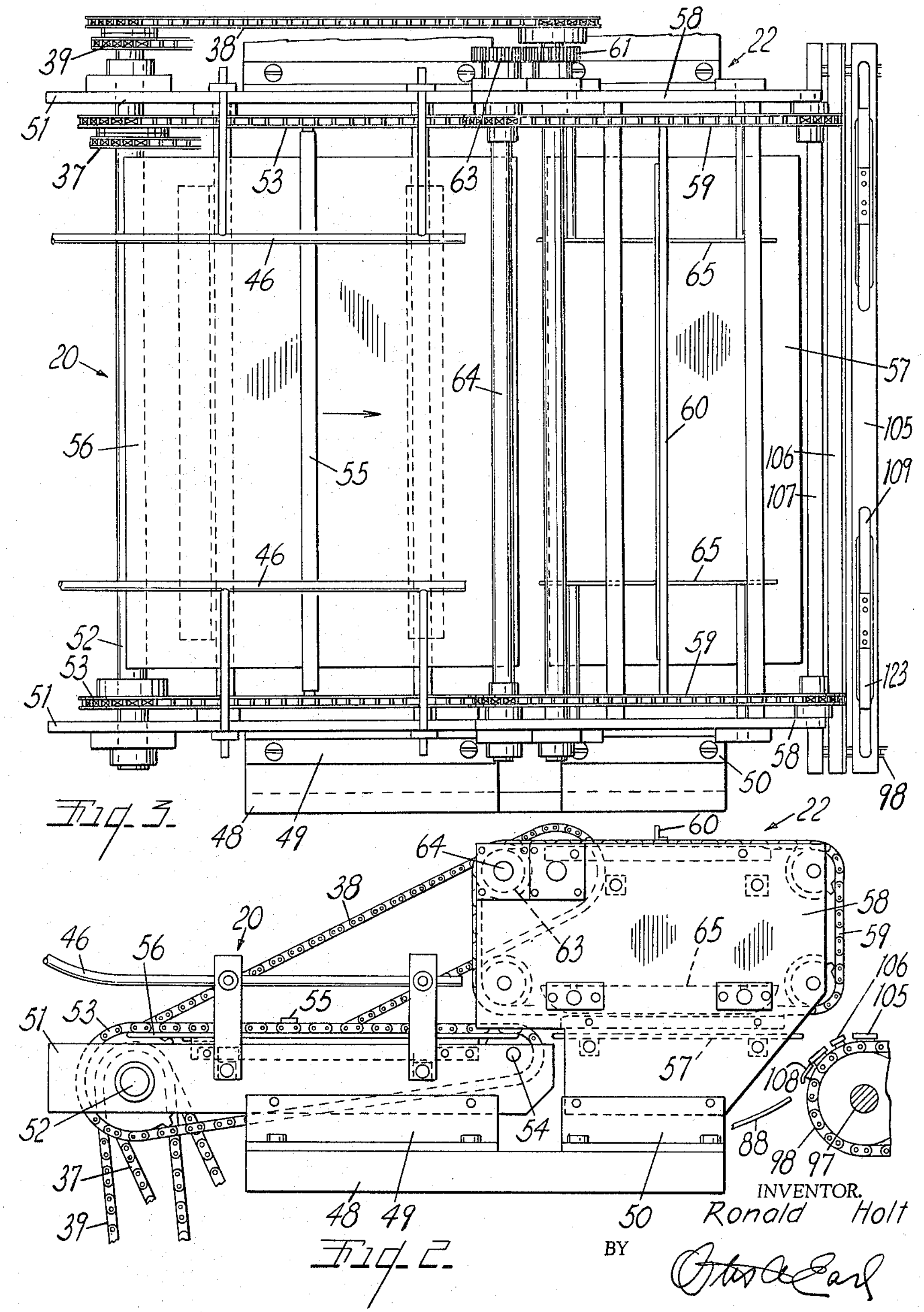
FIG. 2 is a fragmentary side elevational view of the receiving and forwarding conveyors for introducing loaves of sliced bread into the wrapping portion of the machine.
FIG. 3 is a top plan view of the structure shown in FIG. 2.

The receiving and transferring conveyor assemblies 20 and 22 appear most clearly in FIGS. 2 and 3. Side rails or base members 48 which are mounted on the previously described frame work pedestal 23 support angle brackets 49 carrying the receiving conveyor and brackets 50 supporting the transfer or forwarding conveyor. The receiving conveyor 20 consists of a pair of side plates 51 having a drive shaft 52 journaled and supporting drive sprockets for the side chains 53. The opposite ends of the chains are trained around the sprockets on the idler shaft 54 and the chains carry transfer flight bars 55 which advance loaves of bread across the flat supporting plate 56 (see FIG. 3). The shaft 51 is driven on its rear side by the chain 35–37 from the cross shaft 31. The chain loops 53 of the receiving conveyor extend underneath the overhead forwarding conveyor 22 and deliver the sliced loaves to a transfer plate 57 positioned under the overhead transfer conveyor 22. The transfer conveyor 22 consists of upright side plates 58 secured to the brackets 50 and having stub shafts supporting the chain loops 59. The chain loops support transfer flight bars 60 which move downwardly and forwardly across the transfer plate 57. Movement of the transfer conveyor is effected by a gear 61 driven by the chain 38 from the shaft 52 and driving a gear 63 on one cross shaft 64 at the upper rear end of the transfer conveyor. Side guides 65 project adjustably inwardly from the side plates 58 and retain the slided loaves in upright compact position.

*Wrapper web feed and severing and sheet positioning mechanism*

The wrapper web feeding and cutting mechanism indicated generally at 25 in FIG. 1 is an old structure and so is not disclosed or described in greater detail. Any of several known mechanisms for drawing in a web 43 from a supply roll and severing individual wrapper sheets from the leading end of the web will operate in conjunction with the other elements of the wrapping machine. Since the machine of the invention is designed to operate with limp polyolefin synthetic film wrappers, the web feeding and sheet cutting mechanism is provided with the previously described intermittently operating belts 44 which extend from the sheet cutting elements through the sheet positioning structure 26. A clutch indicated at 66 connects shaft 40 to chain 39 in response to the presence of bread on conveyor 20. The incoming web is forwarded from the cutting elements of the cutting mechanism by the belts 44 and is held in feeding or driving engagement therewith by the weight biased rollers 45 carried by suitable supporting frame elements 67 over the rear or receiving ends of the belts 44. These advance the leading end of the web 43 and after the individual sheet has been severed from the web, immediately forward the individual sheet to the sheet positioning assembly 26. The assembly 26 consists of supporting side plates 68 which support the drive roll shaft 69 for the delivery end of the belts 44. Pivoted on the side plates 68 are two pairs of cranks 70 positioned one on each side of the positioning assembly and having their upper arm pivotally connected at 71 to the side bars 72 of a frame carrying the forwarding pressure rollers 73. The rollers 73 function in their lower position to press the individual wrapper sheet into the driven engagement with the belts 44. The lower arms of the cranks 70 are connected by a link 74 for simultaneous motion and the rear or left cranks 70 are connected to a rock shaft 75 having an arm 76 actuated by the pull rod 77 from a cam 78 on the shaft 40. The shaft 40 as previously described is continually driven in timed relation from the receiving conveyor 20 by the clutch 66 and in turn drives the chain 79 to a small sprocket 80 on the stub shaft 81 carried by the bracket 82. A connected large sprocket 83 drives the chain 84 at a higher rate of speed to the sprocket 85 on the previously described shaft 69, so that the belts 44 operate at a relatively high speed to quickly forward the web and the individual wrapper sheets. The belts 44 operate in slots 86 formed in a support plate 87 having an upturned forward end or lip 88 which projects the leading end of the wrapper sheets upwardly as at 89 in FIG. 4. The cam 78 which is driven in timed relation to the other elements of the wrapping machine functions to raise the frame 72 and pressure feed rollers 73 as the wrapper sheet is advanced to receiving position relative to the wrapper conveyor 27. Should the film or wrapper sheets 89 indicate any tendency to slide along the lip 88 when the sheet feed is disconnected, the plate 87 is provided with a plurality of vacuum holes or ports 90 with a suction manifold 91 to which a vacuum may be connected when the frame 72 is raised. This projects the leading end of each wrapper sheet 89 into a position where it is capable of being picked up and advanced by the wrapping conveyor 27 as will be described.

*Wrapper conveyor*

Figures 6, 7:
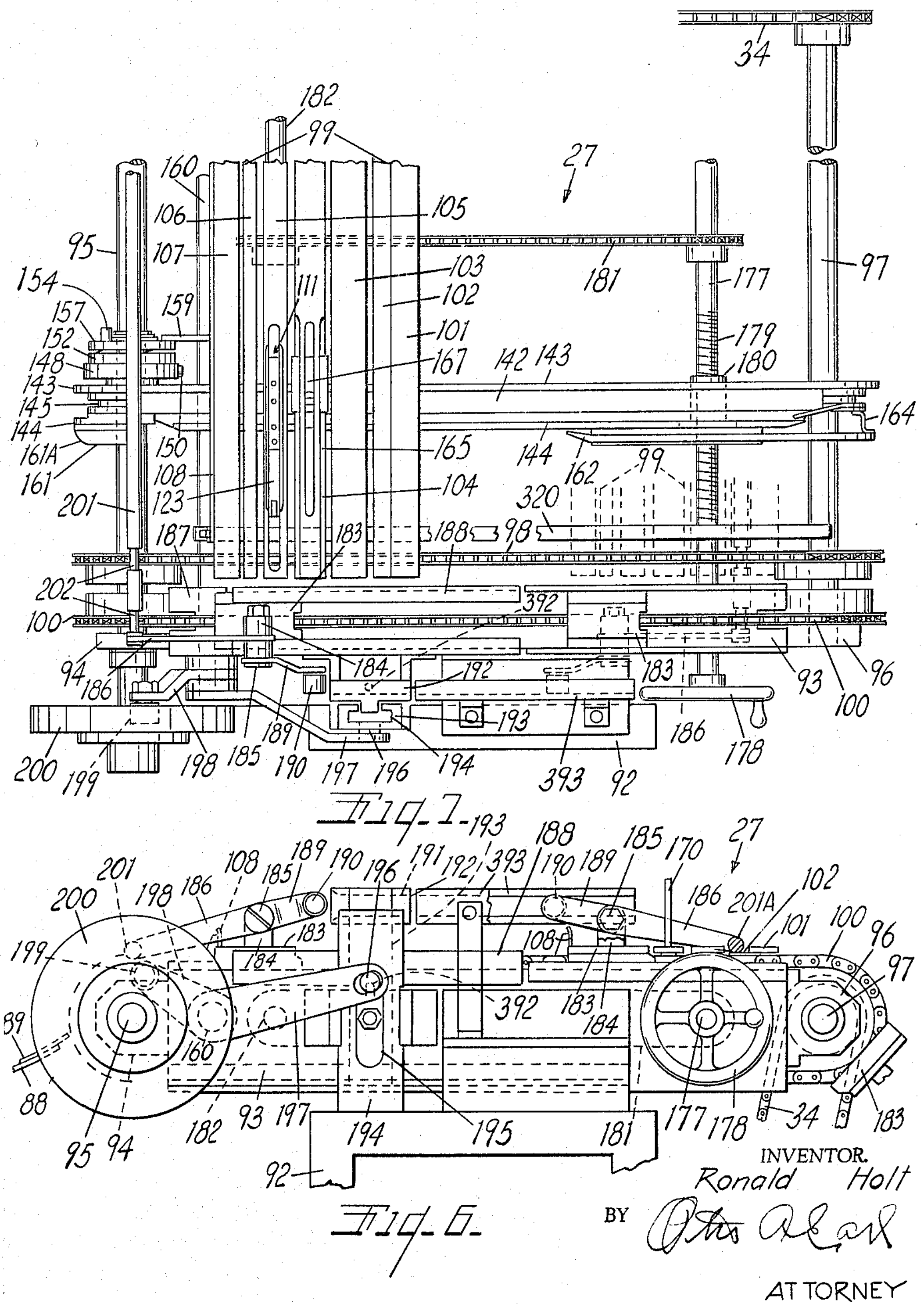
FIG. 6 is an enlarged side elevational view of the wrapping conveyor of the wrapping machine.
FIG. 7 is a fragmentary top plan view of the structure shown in FIG. 6 with parts broken away or omitted to expose subadjacent mechanism.
Figure 8:
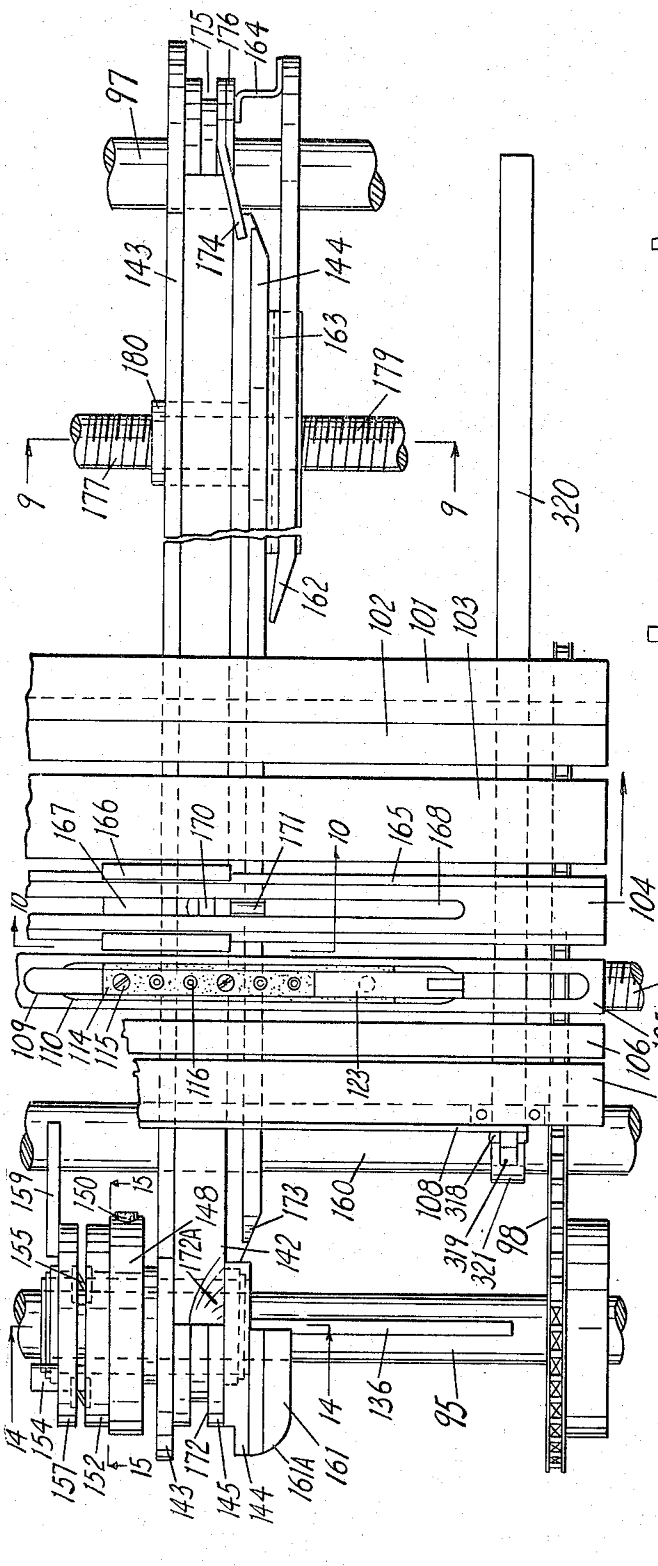
FIG. 8 is an enlarged fragmentary plan view of one side of the wrapping conveyor showing in greater detail the wrapper sheet pickup and gripping mechanism and the loaf or sliced retaining elements of the invention.

The wrapper conveyor is shown more clearly in FIGS. 6 to 15. As appears from FIGS. 1 and 6 the wrapper conveyor 27 is supported on a second pedestal 92 of the main frame 24 and is positioned with its rear end in receiving relation to the forwarded end of the transfer conveyor 22 and the sheet feeding and positioning conveyor 26. The wrapper conveyor 27 consists of supporting side plates 93 having rear bearing blocks 94 supporting the idler shaft 95 and front bearing blocks 96 supporting the drive shaft 97 of the wrapper conveyor. As previously described the shaft 97 is driven by the chain 34 from the main cross shaft 31 of the wrapping machine. The shafts 95 and 97 carry sprockets driving an interior pair of conveyor chain loops 98 supporting and advancing plural groups of flight bars 99 which collectively form separate loaf advancing flights. Positioned outwardly from the chain loops 98 and the loaf flights 99 are second chain loops 100 which support wrapper foldover mechanism to be described. With reference to FIGS. 7 and 8 it is pointed out that only one side of the wrapping conveyor 27 is illustrated and that the opposite side of the conveyor is symmetrical. The loaf flights 99 are equally spaced around the loops 98 and the loops are driven as previously described in timed relation to the loaf advancing flight bars of the forwarding conveyor 22 so that each individual loaf is successively transferred from the forwarding conveyor to a flight of the wrapping conveyor.

In the example illustrated the loaf flights 99 consist of a leading flight bar 101 which has a downwardly stepped trailing portion 102. Next rearwardly of this flight bar is a flat intermediate flight bar 103 followed by a flight bar 104 which also supports loaf or slice retaining fingers to be described. Rearwardly of the finger supporting flight bars are wrapper sheet gripper flight bars 105 followed by a narrow spacer bar 106 and a rear flight bar 107 having a loaf forwarding plate 108 pivoted thereon. The expedient of plural bars 101 to 107 permits each flight to conform closely to the curvature of the sprockets at the ends of the chain loops 98. This is of importance as the previously described lip 88 of the wrapper sheet delivery and positioning conveyor projects into close proximity to the upwardly moving rear or receiving end of the folding conveyor and the leading edge of each wrapper sheet is projected into the path of the several flight bars and particularly the flight bars 105 and the sheet grippers thereof.

Figures 12, 13:
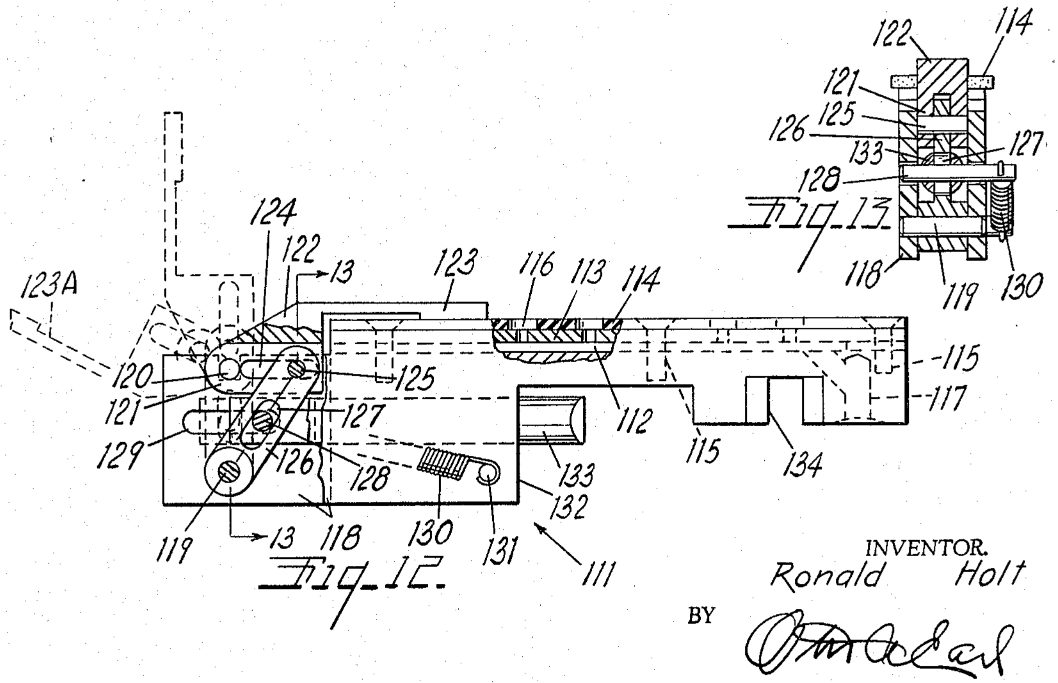
FIG. 12 is an elevational view partially broken away in cross section of the leading side of the vacuum pickup and gripper mechanism for advancing the wrapper sheets with the wrapping conveyor.
FIG. 13 is a transverse cross sectional view taken along the plane of the broken line 13—13 in FIG. 12 and illustrating the wrapper sheet gripper in collapsed gripping position.

The construction of the flight bars 105 and the sheet grippers is most clearly illustrated in FIGS. 7, 8 and 12. The bars 105 define longitudinal slots 109 near their ends which are outwardly shouldered at 110 to receive the sheet gripper blocks indicated in their entirety at 111. The gripper blocks 111 define a vacuum chamber 112 in their upper surface closed by a cover plate 113 and a top rubber or deformable plate 114 held in place by screws 115. The rubber plate projects over the recessed sides 110 of the flight bar and support the block in the flight bar while permitting longitudinal adjustment of the block in the slot 109 as will be described. The plates 113 and 114 define outwardly opening suction ports 116 which are advanced upwardly and forwardly in the upper rear quadrant of the movement of the wrapping conveyor across the projected end of the wrapper sheet 89 on the lip 88. The vacuum chamber 112 is provided with an inwardly facing vacuum or suction passage 117 which opens inwardly of the conveyor loop 98 and registers in timed relation with a rotating suction passage on the shaft 95 to be described.

At the laterally outer end of the block 111 the block is slotted or bifurcated perpendicularly to the plane of the flight bar 105 to provide spaced ears 118. These ears carry a first pivot pin 119 (see FIG. 12). A second pivot pin 120 supported in notches in the upper or outer edges of the ears 118 pivotally supports a depending tongue 121 formed on the bottom of a sheet gripper 122 having an inwardly projecting arm 123. The tongue 121 is slotted as at 124 to receive the drive pin 125 carried on the upper end of link 126 and pivoted on the pin 119. The link is slotted as at 127 and receives a drive pin 128 projecting through slots 129 in the ears 118. One end of the pin 128 projects beyond the side of the block 111 and incidentally retains the block in the flight bar 105 by engagement with the underside of the flight bar. Springs 130 anchored to the sides of the block at 131 bias the link 126 and the gripper fingers 123 downwardly against the outer ends of the rubber pad or cover 114.

The bottom or inner side of the block 111 is notched downwardly as at 132 and defines a horizontal bore slidably receiving the actuating plunger or pin 133 which projects between the ears 118 to the link 126. The drive pin 128 and link 126 are opposed by the outer end of the actuating pin 133 so that outward motion of the inner end of the actuating pin as will be described swings the gripper arm 123 to the outward open position shown by the dotted lines at 123A in FIG. 12. The underside of the block 112 is further notched as at 134 to receive and engage a guiding and adjusting rail to be described. The shaft 95 which is driven from the shaft 97 by the chain loops 98 and 100 is provided at its ends with key slots 135 receiving the elongated key 136 (see FIGS. 14 and 15). The key 136 slidably and drivingly engages the inside of a sleeve or hub 137 positioned inwardly of the ends of the shaft 95. The sleeve or hub 137 has a laterally inner abutment ring 138 held axially in place by the snap ring 139. At its outer end a snap ring 140 engages the side of a spacer washer 141 which is in turn abutted against the end of a nonrotatable cam support rail 142. The end of the rail 142 is half-round to embrace the forward half of the sleeve 137. Connected to the sides of the cam support rail 142 and projecting in nonrotating embracing relation around the sleeve 137 are an inner guide plate 143 and an outer guide plate 144. The plates 143 and 144 nonrotatably support between themselves a half-round nonrotatable guide block 145 (see FIG. 8).

Positioned inwardly from the inner guide plate 143 and formed integrally with the sleeve of hub 137 is a radially projecting drive shoulder 146 (see FIG. 14) having a notch therein which drivingly receives and engages the drive pin 147 projecting from the side of a vacuum connecting disk 148. The disk 148 has a radially outwardly opening passage 149 with a rubber or deformable grammet 150 therein which rotates in timed relation with the flight on the folding conveyor and specifically in timed relation so as to register with the suction passages 117 of each successive gripper block 111. Opening laterally inwardly from the side of the connecting disk 148 is a port 151 which opens against the side of a nonrotating manifold disk 152. As appears in FIG. 15, the disk 152 is centered around the rotating sleeve 137 and has an approximately 90° manifold opening 153 formed in the upwardly and forwardly advancing quadrant relative to the rotation of the disk 148. A nonrotatable vacuum connection 154 projects from the inner side of the disk 152 for connection to a suitable source of vacuum which is not illustrated (see FIGS. 8 and 15 for the vacuum connection 154). The nonrotating disk 152 is held against rotation and also held in sealing engagement with the side of the rotating vacuum disk 148 by means of three coil springs 155 having their ends received in opposed recesses 156 formed in the sides of the disk 152 and a fixed disk 157. The disk 157 is held axially on the sleeve 137 by the previously described collar 138 and snap ring 139. With reference to FIG. 8 it will be seen that an arm 159 secured to the disk 157 projects forwardly and slidably embraces the rock shaft 160.

Secured to the outer side of the previously described plate 144 on the cam support rail 142 and on the rear side of the shaft 95 is a semicircular cam 161 having an angular and axially curved cam surface 161A. Due to the position of the notch 132 in the gripper blocks 111 and the lateral locating engagement of the inner cam rail 143 in the notch 134, each gripper block is advanced successively upwardly and forwardly with the end of the gripper actuating plunger 133 passing in camming engagement with the surface 161A. This causes the gripper arm 123 to swing to the outward position 123A shown in dotted lines in FIG. 12 as the gripper bar rises to the top of the folding conveyor and clears the leading edge 89 of the wrapper sheet which has been advanced by the wrapper sheet positioning conveyor 26 shown in FIG. 4. The vacuum connection 117 on the gripper block simultaneously registers with the deformable nipple 150 on the rotating vacuum connection and vacuum is created in the port 149 from the arcuate manifold 153 to pick up this leading edge 89 so that the sheet is advanced with the wrapping conveyor. As the actuating plunger 133 is advanced with the flight bar 105 past the end of the cam 161 the spring 130 functions to snap the gripper arm 123 down on the leading edge of the wrapper sheet. As the gripper arm 123 becomes effective to hold and advance the wrapper sheet, the port 151 rotates out of registry with the manifold 153 as the action of the vacuum in initially picking up the wrapper sheet is no longer needed. The gripper 123 remains in effective sheet advancing engagement with the wrapper sheet approximately ⅔ of the way along the upper reach of the wrapping conveyor and until the gripper actuating plunger 133 comes into lateral engagement and camming contact with the gripper release rail cam 162 (see FIGS. 8 and 9).

The rail 162 is supported by an angle bracket 163 on the side of the cam rail 144 and is carried arcuately and downwardly along the front side of the drive shaft 97 by means of a bracket 164. The gripper arm 123 is thus moved upwardly to release position prior to moving the loaf and wrapper from the wrapping conveyor.

*Slice retaining finger*

Figure 10:
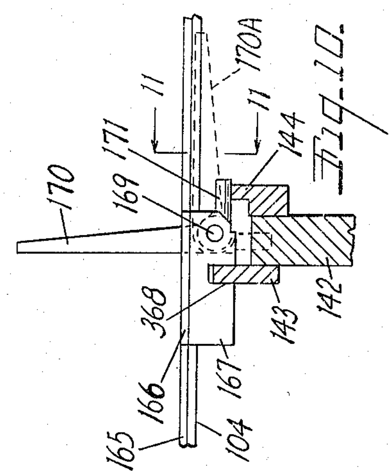
FIG. 10 is a fragmentary cross sectional view taken along the plane of the line 10—10 in FIG. 8 illustrating the mounting and action of the sliced retaining fingers of the wrapping conveyor.
Figure 11:
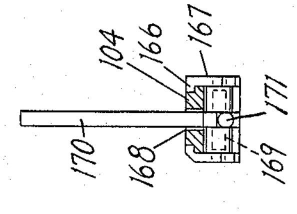
FIG. 11 is a fragmentary cross sectional view taken along the plane of the line 11—11 in FIG. 10 and showing details of the mounting and adjustment of the slice retaining fingers.
Figure 9:
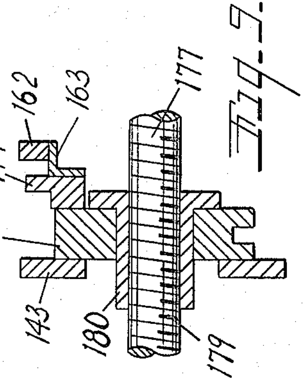
FIG. 9 is a fragmentary cross sectional view through the cam structure and adjusting mechanism of the folding conveyor taken along the plane of the line 9—9 in FIG. 8.
Figures 14, 15:
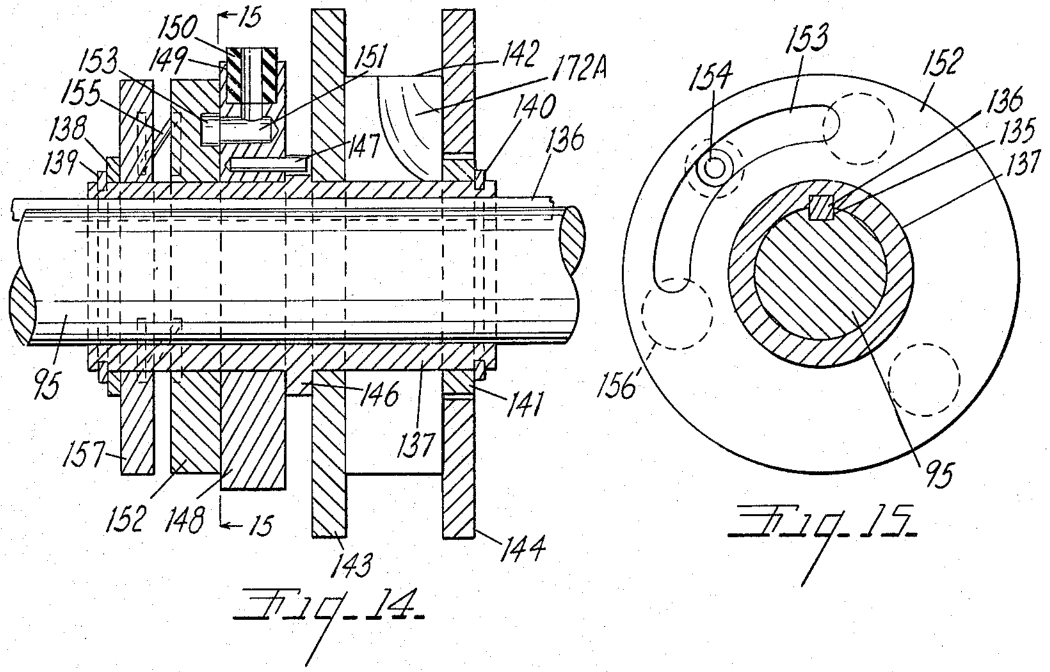
FIG. 14 is a fragmentary vertical cross sectional view taken along the plane of the line 14—14 in FIG. 8 and showing the vacuum connections to the vacuum pickup of the wrapping conveyor in one rotated position.
FIG. 15 is a fragmentary transverse cross sectional view taken along the plane of the line 15—15 in FIGS. 8 and 14.

As appears most clearly in FIGS. 8, 10 and 11 the previously described flight bars 104 are downwardly shouldered as at 165 on their edges to supportingly engage the inturned ears 166 on the sides of a slice retaining finger block 167. The flight bar 104 is longitudinally slotted as at 168 at each end and the block 167 is adjustable along the slot as will be described. The underside of the block 167 is notched as at 368 in FIG. 10 with the inner guide rail 143 riding in the slot to adjust and fix the lateral position of the guide block. Pivoted in the outer end of the block 167 by the pin 169 is an elongated slice retaining finger 170 having a laterally or right angularly projecting actuating pin or finger 171 which projects either horizontally outwardly as in FIGS. 8 and 10 or vertically downwardly into the space between the support and guide rails 143 and 144. The previously described half-round spacer block 145 on the rear side of the shaft 95 and at the rear end of the rail 142 defines a half-round arcuate guide slot 172 which receives the pin 171 in downwardly or radially inwardly extending position relative to the advancing motion of the wrapping conveyor. In this position, the slice retaining finger 170 is held in outwardly and downwardly rotated position as shown by the dotted lines at 170A in FIG. 10 as the bar 104 approaches the upper reach of the wrapping conveyor. In this position the retaining finger does not interfere with the delivery and pick-up of the wrapper sheet or the delivery of the sliced loaf to the flight from the transfer conveyor 22. Immediately upon leaving the guide slot 172, the inwardly turned finger 171 engages a laterally outwardly and upwardly cammed surface 172A formed on the forward end of the cam support bar 142 which moves the pin laterally outwardly into the path of the axially cammed surface 173 which raises the pin to horizontal outwardly extending position and supports the slice retaining finger 170 in upright slice retaining position substantially completely along the wrapping conveyor. The sliced loaf transferred to each group of flight bars is thus engaged endwise between the fingers 170 toward the forward side of the loaf before the trailing side of the loaf is released from the side guides 65 of the loaf transfer conveyor 22 and there is no opportunity for the loaf or its end slices to collapse outwardly. The slice retaining finger 170 is located ahead of the sheet pickup and gripper block 111 so as not to interfere with the positioning of the wrapper sheet part way under the width of the loaf on the flight group. The finger 170 and its actuating projection 171 are held erect on the rail 144 until the actuating projection 171 is advanced under the vertically and laterally angled cam finger 174 just over the drive shaft 97. The cam finger 174 moves the projection 171 downwardly and inwardly into a guide notch 175, formed in the semicircular plate 176 secured to the cam and guide rail 143 so that the slice retaining finger is retracted and held in retracted position in passing around the forward discharge end of the wrapping conveyor. This permits the loaf and the partially completed wrapper to be transferred from the wrapping conveyor to the end folding and sealing conveyor 28 without interference from the slice retaining fingers as will be described in greater detail presently.

*Lateral adjustment for variable loaf lengths*

It will be appreciated that the vacuum pickup block 111 and the slice finger retaining block 167 are duplicated at each side of the wrapping conveyor along with the controlling rotating vacuum disk 148 and the cams and support rails 142. The shafts 95 and 97 and the cylindrical connecting and guide rod 160 slidably support these elements for lateral adjustment on the flight bars 104 and 105. Rotatably journaled in the side plates 93 is a first adjusting screw 177 having a hand wheel 178 on its forward side (see FIGS. 6 and 7). The screw has oppositely threaded portions 179 near each end which pass in threaded engagement with traveling nuts 180 carried by the cam support and guide rails 142. The screw 177 is connected by the chain 181 (see FIG. 7) with a corresponding screw 182 journaled in the side plate 93 toward the rear end of the conveyor. Operation of the screws 179 and 182 functions to change the spacing between the cam support and guide rails 142 and the rails in turn move the cams and vacuum connections on the shafts 95 and 97. The movement of the rails 143 causes corresponding lateral adjustment of the gripper blocks 111 and the slice finger support blocks 167. It is thus practical to wrap different sized loaves of bread on the wrapping conveyor.

*Foldover mechanism*

It will be seen that the structure described thus far positions the leading edge of a wrapper sheet part way under the trailing side of the loaf on each flight 99 and controls the position of the sheet and the loaf on the flight with the trailing portion of the sheet trailing behind each flight. In order to fold this trailing portion of this wrapping sheet over the loaf as the loaf advances with the flight, the outer chain loops 100 which are advanced concurrently with the chain loops 98 are provided with a carrier block 183 positioned opposite the end of each flight group 99 and provided with outwardly projecting fingers 184 forming pivotal supports 185 for foldover arms 186. The blocks 183 are advanced by the chains 100 around the rear shaft 95 and are carried onto supporting rails 187. Almost immediately the blocks 183 are further retained and steadied between overhanging guide rails 188. Connected to the pivots 185 and swingable with the arms 186 are forwardly projecting and outwardly angled actuating arms 189 having rolls 190 on their outer ends. The rolls 190 are advanced by the blocks and the chains 100 into horizontal slots 191 formed in actuating blocks 192 carried on the upper ends of vertical slide bars 193. The slide bars 193 are guided in an upright slideway 194 having a vertical slot 195 therein (see FIG. 6) through which a pin 196 projects to the side of the machine. The pins 196 engage and are actuated by the crank arms 197 pivoted on the ends of the rock shaft 160.

Fixedly connected to one of the arms 197 and rockable therewith is an arm 198 having a follower roll 199 on its end engaged in a cam slot formed in the inner side of cam disk 200. The disk 200 operates in timed relation with the advancing flight due to its rotation with the shaft 95 and as the rolls 190 enter the slots 191 the arms 198 and 197 are actuated by the cam wheel 200 to depress the slide bar 195 and the arms 189. This raises the trailing arms 186.

Supported between the arms 186 at the opposite ends of each flight and trailing behind the flight are foldover bars 201. The bars weight bias the arms 186 to trail behind the pivots 185 and thus advance upwardly under the trailing end of the wrapper sheet advanced by the associated flight and the grippers thereon. As appears in FIG. 7 the foldover bars 201 have notched portions 202 riding on the chain loops 98 and 100 so that the bars 201 will move in close clearing relation under the lip 88 on the wrapper sheet feeding assembly and under the front edge of the transfer plate 57 on the loaf assembly 22.

As the arms 186 and 189 advance, the foldover bars 201 and the rolls 190 advance through the slots 191, the blocks 192 are drawn downwardly causing the foldover bars to swing upwardly in an elliptical path over the top of the loaf on the flight group 99 to the position shown in alternate at 201A in FIG. 6. At the bottom of its travel, the guide block 192 receives the end of a fixed pin 392 that projects into the bottom of the slot 191 and momentarily obstructs movement of roller 190 through the slot. This assures that arms 186 will swing over upright centered position. As block 192 rises, pin 392 is drawn out of the slot and forward travel of roll 190 continues. On leaving the slot 191, the roller 190 enters guide rail 393 holding the bar 102 down. In this position the foldover bar rests on the depressed portion 102 of the flight bar 101 and holds the originally trailing end of the wrapper sheet on the flight bar with the formerly trailing edge now projecting forwardly over the flight bar 101. The forwardly projecting portion of the wrapper sheet is supported by the flight bar 101. With reference to FIG. 1 and FIG. 6 it will be seen that the partially wrapped loaf has advanced at this time to between the end fold elements 202 of the end folding and sealing assembly 28. The action of this assembly will be described presently. As previously pointed out the sheet gripping fingers 123 are actuated by cam edge 162 at this point to release the former leading edge of the wrapper sheet. The loaf retaining fingers 170 remain erect until after the end folding elements 202 have gained control of the ends of the loaves and have partially folded in the trailing sides of the wrapper sheet where the sheet is folded along the back of the loaf. The fingers 170 are retracted into the planes of the flight bars 104 to clear the plate 47 of the end folding and sealing mechanism. The foldover bars 201, now in advance of their supporting pivots 185, follow by gravity around the downwardly moving front ends of the chain loops 98 and 100.

*End folding and sealing mechanism*

Figure 17:
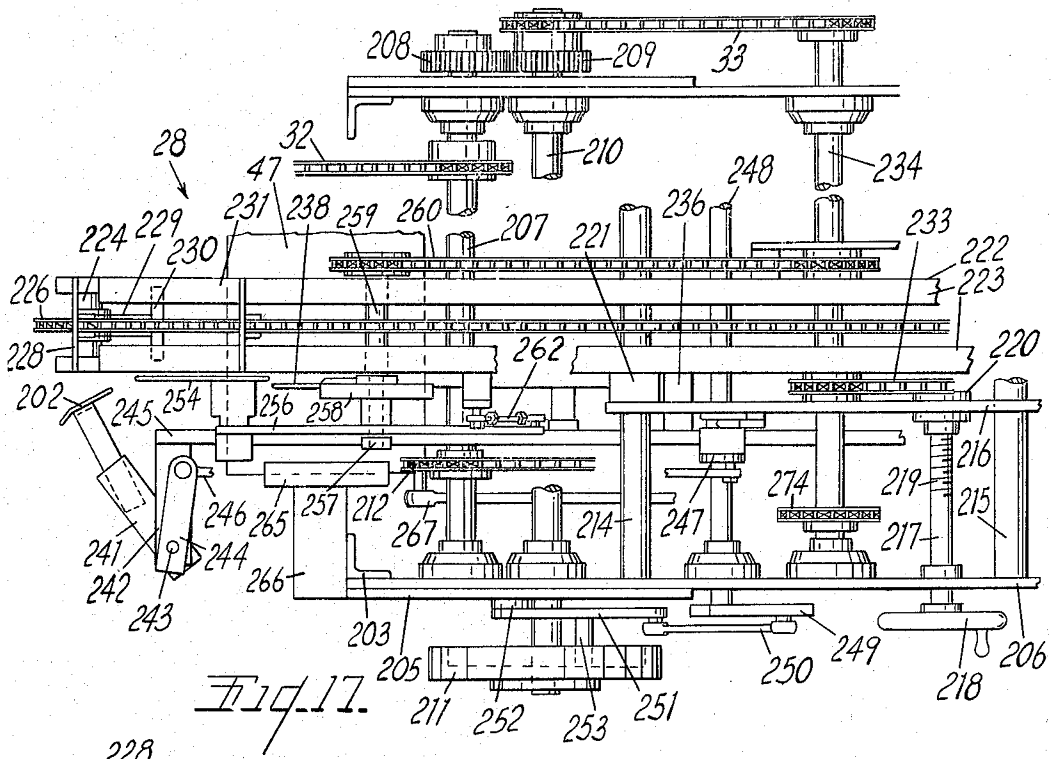
FIG. 17 is a fragmentary top plan view of the end flap folding elements of the structure shown in FIG. 16 with parts omitted and broken away.
Figure 16:
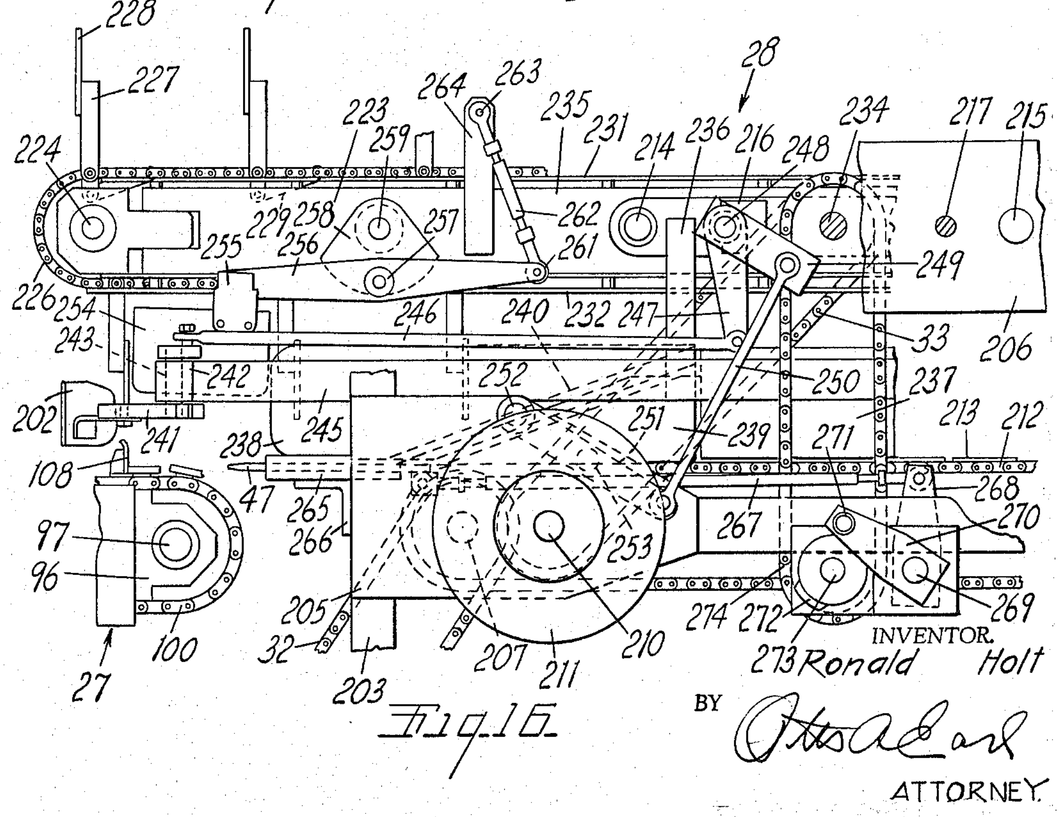
FIG. 16 is an enlarged fragmentary side elevational view of the rear or intake end of the end flap folding and package sealing conveyor of the wrapping machine.

The end folding and sealing mechanism 28 is shown most clearly in FIGS. 1, 16 and 17. It should be noted that FIG. 17 omits the lower portion of the end folding and sealing mechanism which advances the loaves partially through the mechanism. The structure is supported on upright columns 203 and 204 which support lower side plates 205 and upper side plates 206. The side plates 205 support a cross shaft 207 which is driven by the previously described chain 32. A gear 208 on the rear end of the shaft drives a mating gear 209 on a second cross shaft 210 to drive the chain 33 to the overhead conveyor of the sealing and folding mechanism. At its forward end the shaft 210 carries and drives a cam wheel 211 for a purpose to be described. The first shaft 207 carries sprockets for driving two conveyor chain loops 212 only one of which appears in FIG. 17. These chain loops 212 carry conveyor flights for supporting and advancing the loaves of bread after they have been received from the transfer plate 47. The conveyor 212 may be of various types of construction and is not illustrated in great detail. Loaf supporting plates or flights 213 are shown conventionally on the chain loops 212 in FIG. 16.

Above the side plates 205, the plates 206 support a rear cross slide bar 214 and a front cross slide bar 215 which slidably support a pair of longitudinally extending support bars or rails 216 for transverse adjustment relative to the conveyor 212 positioned therebelow. Only one of the support bars 216 appears in FIGS. 16 and 17. A width adjusting screw or rod 217 rotatably journaled in the side plates 206 and operated by the hand wheel 218 has oppositely threaded portions 219 engaged in traveling nuts 220 carried by the rails 216 to adjust the spacing between the rails. The rails 216 are connected by means of suitable spacer blocks 221, one of which appears in FIG. 17, to overhead conveyor support frames 222 consisting of spaced longitudinally extending guide rails 223. The rails 223 carry rear cross shafts 224 and front cross shafts 225 around which are trained the chain loops 226. The chain loops 226 support intermediate portions of flight bars 227 having pusher plates 228 mounted on their radially outer ends. Links 229 connect the inner ends of the bars 227 to transverse guide bars 230 connected to the chains in trailing relation to their connected flight support bars.

The bars 230 travel in guide tracks 231 along the top of the conveyor and guide tracks 232 on the lower forwardly advancing reach of the conveyor to give the pusher plates 228 a rectilinear movement around the ends of the chain loops. The chains 226 are driven by means of a chain 233 driven from a sprocket on a cross shaft 234. The cross shaft 234 is journaled in the side plates 206 and passes slidably through the support plates 216 and between the rails 231. The sprocket driving the chain 233 slides longitudinally on the shaft with lateral adjustment of its adjacent support rail 216. The chain 233 extends forwardly and drives the shaft 225 which in turn drives the chain loops 226. The shaft 234 is driven by the previously described chain 33 on the back side of the machine. The guide rails or tracks 231 and 232 are supported on the upper and lower edges of longitudinally elongated plate members 235 which adjust laterally or transversely of the conveyor with the support and adjusting plates 216.

Secured to the outer sides of the plates 235 are a plurality of outwardly extending support brackets one of which appears at 236 in FIGS. 16 and 17. These brackets extend downwardly and support side guide or retaining plates 237 which laterally retain the ends of the loaves being transferred therebetween. Rearwardly of the plates 237 and extending toward the inlet end of the folding and sealing conveyor, there is provided a composite end plate 238 and 239 with an upwardly and forwardly inclined folding slot 240 formed between the opposed edges of the plates. This slot functions in a well known manner to plow up the final end flap fold on the wrapper sheet just before the package is advanced to between the plates 237. The combination of the support bars or rails 216, side plates 235 and end plates 237, 238 and 239 together with the mechanism supported thereon constitute laterally adjustable overhead conveyor side frames.

The previously described end folding members 202 are mounted at the rear end of the flap folding and sealing assembly 28 by means of arms 241 pivotally supported on brackets 242 at 243 and having crank arms 244 extending transversely inwardly toward the outer sides of the bars 245 which project rearwardly from the end plates 238. The crank arms 244 are oscillated by push rods 246 that project forwardly to crank arms 247. The crank arms are connected to a transverse rock shaft 248 having its ends journaled in the side plates 206. Connected to the front end of the shaft 248 as at 249 is a second crank arm connected by the link 250 to a lever 251. The lever 251 is pivoted to the lower side plate 205 at 252 and carries a follower roll or pin 253 engaged in a cam slot on the inner side of the cam wheel 211. The cam wheel 211, operating in timed relation with the other elements of the folding and sealing conveyor due to its connection to the shaft 210, actuates the linkage from the arm 251 to the end folders 202 to swing the end folders inwardly and forwardly as each loaf and the wrapper therearound approaches the end of the wrapping conveyor 27. This places a first inwardly extending fold in the trailing end of the wrapper and temporarily takes over the function of retaining the loaf in erect position. It is after this movement of the first end folders that the slice retaining fingers 170 are retracted.

Positioned just ahead of the first end folder 202 are a pair of vertically reciprocable end folding plates 254 carried by the brackets 255 on the rear ends of levers 256. The levers 256 are pivotally connected at 257 to a rotating crank 258 on the short stub shaft 259 carried by each transversely adjustable side or end retaining assembly of the wrapping and sealing conveyor. The shafts 259 have sprockets on their inner ends which are driven by chains 260 from the previously described cross shaft 234 and the opposite ends of the levers 256 have a swinging pivotal connection at 261 to an adjustable link 262 depending from a fixed pivot 263 on the upstanding bracket 264. The timed driving connection from the folding plates 254 through the shaft 234 to the other portions of the machine cause the plates 254 to move in an orbital path forwardly and upwardly and then rearwardly and downwardly along the ends of the loaves after the first end folders 202 have formed the first end fold in the wrapper sheet. The folders 254 thus fold the upper ends of the tubular wrapper downwardly over the first folds and further retain the slices in the loaf together. As the loaf is advanced to the rear ends of the end plates 238, the plates 238 form a third overfold in the leading sides of the wrapper. The projecting lower edges of the folded wrapper are conveyed and directed by the transfer plate 47 into the inclined folding slot 240 to fold up the last end fold on the package.

The transfer plate 47 is slidably supported in slideways 265 supported upon the angled cross bar 266 and is connected at its forward corners to the push rods 267 which extend forwardly to cranks 268 mounted on a rock shaft 269 extending across the machine below the narrowed portions of the side plates 205 (see FIG. 16). The rock shaft 269 is provided on its front end with a crank arm 270 having a follower roll 271 positioned in the path of a cam 272 mounted on the end of a cross shaft 273 also journaled in the sides of the machine. The shaft 273 is driven by a chain 274 extending downwardly from a sprocket on the shaft 234 so that the transfer plate 47 is reciprocated in timed relation to the motion of the wrapping conveyor 27. As the previously described foldover bars 201 and the leading flight bars 101 on the wrapping conveyor advance downwardly around the leading end of the wrapping conveyor 27, the transfer plate 47 is projected rearwardly under the leading end of the loaf to force the leading and remaining free edge of the wrapper sheet underneath the loaf and the initial leading end of the sheet which is positioned half way under the loaf. Simultaneously with this final underwrap of the wrapper sheet, the previously described end fold forming and loaf retaining operations of the folders 202 and 254 is taking place. It should be noted that the first end flap folders 202 and their retaining engagement with the slices of the laves do not interfere with the retracting motion of the slice retaining fingers 270 and that the action of the transfer plate 47 in folding under the bottom lap of the wrapper tube does not take place until after the slice retaining fingers have been retracted so that a smooth tight underlap is obtained on the loaf by the combined action of the advancing motion of the loaves by the overhead conveyor pusher plates 228 and the folding conveyor 27 and the retracting motion of the transfer plate 47. Thus the loaves and the wrapper sheet are under continuous positive control and the machine can be operated at high speeds to wrap a large number of sliced loaves of bread without at any time losing control of the sliced loaves or the wrapper as the wrapper is formed around the loaves and folded and later sealed.

As the rear flight bars 107 approach the transfer plate 47, loaf pusher plates 108 which are pivoted on the back edge of the bars by ears 318 (see FIG. 8) fold backwardly to clear the transfer plate. This is accomplished by blocks 319 pivoted on the ears and connected to the plates 108 running off of supporting rails 320. At the infeed end of the wrapping conveyor, rails 320 have curved ends 321 that pick up the blocks and swing the plates up after passing the wrapping sheet feed plate.

The wrapping machine has been described in a form adapted for wrapping sliced bread in limp film wrappers. However, it is equally useful for wrapping many articles in wrappers of other types of wrapping material. If the slice retaining fingers 170 are not needed they can be omitted.

What is claimed as new is:

1. A wrapping machine for sliced bread comprising:

a first conveyor adapted to receive loaves of sliced bread from a slicer and advance the loaves in spaced side by side relation, a forwarding plate positioned to receive loaves from said first conveyor and having an overhead conveyor positioned over the plate and driven at the same speed as said first conveyor to continue the advance of said loaves, a wrapper feeder and cutter positioned under said first conveyor and said forwarding plate, a wrapping sheet delivery lip inclined arcuately upwardly at the end of said delivery plate and terminating just below the plate, a third conveyor having sets of flight bars spaced and driven in time with said overhead conveyor to separately receive the loaves from said plate, vacuum chambers longitudinally adjustably mounted on the ends of one flight bar of each set of bars with suction ports opening outwardly of said third conveyor, disks rotating with said third conveyor and having suction passages registering with said chambers on the upwardly rotating end of said third conveyor, angularly fixed manifolds longitudinally adjustably mounted in coacting suction connecting relation to said passages in said disks during upwardly rotating motion of said chambers, means connected to develop suction in said manifolds whereby suction in said ports attracts the leading edge of a wrapper to said ports and advances the wrapper from said lip, said manifolds terminating when said disks and said ports reach the upper side of said third conveyor to cut off the suction from said ports, wrapper sheet grippers carried by said flight bars at the outer sides of said ports and longitudinally adjustable with said vacuum chambers, cam means adjustable with said manifolds and coacting with said grippers to open the grippers as said vacuum chambers move upwardly and to close the grippers onto said flight bars and the sides of the leading ends of said sheets as said chambers move away from said manifolds, slice retaining fingers pivoted on the ends of another flight bar of each set ahead of said vacuum chambers and adjustable longitudinally therewith, other cam means positioned along the top flight of said third conveyor and adjustable with said vacuum chambers in coacting relation with said fingers to raise the fingers into slice retaining engagement with the ends of the loaf on the set of bars, a pair of chain loops driven with said third conveyor at the outer sides thereof and having a pair of pivot supports connected to the chains at the ends of each set of flight bars on said third conveyor, rocker arms having their intermediate portions pivotally mounted on said pivot supports and advanced therewith in parallel relation to the motion of said third conveyor, a wrapper sheet fold over bar carried between like ends of opposed rocker arms and weight biased downwardly in trailing relation at the upwardly moving end of said third conveyor, vertically reciprocable drive elements at the sides of said third conveyor having laterally inwardly facing horizontal slots therein, actuating follower roll elements on the other end of said rocker arms receivable in said slots by advancing motion of said chains, drive means timed with said third conveyor and connected to lower then raise said driven elements as said follower elements are advanced through said slots, said foldover bar resting on a cross bar at the leading side of the loaf and holding an intermediate portion of the wrapper sheet thereto after the bar is rocked forwardly, first end wrap folder elements laterally swingably mounted over the off-feed end of said third conveyor and driven in timed relation to fold in the back side of the wrapper sheet on each loaf, said cam means actuating said retaining fingers being shaped to retract the fingers as said first folder elements move inwardly, second top folder elements swingable downwardly in wrapper folding action after said first folder elements, a horizontal bottom fold plate reciprocable toward the downwardly moving end of said third conveyor to strip the leading end of said wrapper sheets from under said foldover bars and fold the leading end of the wrapper under each loaf and support the loaf from the end of the third conveyor, and an end wrap folding and sealing way receiving loaves from said third conveyor including an overhead conveyor engageable with individual loaves to move the loaves over said plate.

2. A wrapping machine for sliced bread comprising:

a first conveyor adapted to receive loaves of sliced bread from a slicer and advance the loaves in spaced side by side relation, a forwarding plate positioned to receive loaves from said first conveyor and having an overhead conveyor positioned over the plate and driven at the same speed as said first conveyor to continue the advance of said loaves, a wrapper feeder and cutter positioned under said first conveyor and said forwarding plate, a wrapper sheet delivery lip inclined upwardly at the end of said delivery plate and terminating just below the plate, a third conveyor having sets of flight bars spaced and driven in time with said overhead conveyor to separately receive the loaves from said plate, vacuum chambers mounted on the ends of one flight bar of each set of bars with suction ports opening outwardly of said third conveyor, disks rotating with said third conveyor and having suction passages registering with said chambers on the upwardly rotating end of said third conveyor, angularly fixed manifolds mounted in coacting suction connecting relation to said passages in said disks during upwardly rotating motion of said chambers, means connected to develop suction in said manifolds whereby suction in said ports attracts the leading edge of a wrapper to said ports and advances the wrapper from said lip, wrapper sheet grippers carried by said flight bars at the outer sides of said ports and longitudinally adjustable with said vacuum chambers, cam means coacting with said grippers to open the grippers as said vacuum chambers move upwardly and to close the grippers onto said flight bars and the sides of the leading ends of said sheets as said chambers move away from said manifolds, slice retaining fingers pivoted on the ends of another flight bar of each set ahead of said vacuum chambers, other cam means positioned along the top flight of said third conveyor in coacting relation with said fingers to raise the fingers into slice retaining engagement with the ends of the loaf on the set of bars, a pair of of chain loops driven with said third conveyor at the outer sides thereof and having a pair of pivot supports connected to the chains at the ends of each set of flight bars on said third conveyor, rocker arms having their intermediate portions pivotally mounted on said pivot supports and advanced therewith in parallel relation to the motion of said third conveyor,
a wrapper sheet foldover bar carried between like ends of opposed rocker arms and weight biased downwardly in trailing relation at the upwardly moving end of said third conveyor,
vertically reciprocable drive elements at the sides of said third conveyor having laterally facing horizontal slots therein,
actuating follower roll elements on the other end of said rocker arms receivable in said slots by advancing motion of said chains,
drive means timed with said third conveyor and connected to lower then raise said drive elements as said follower elements are advanced through said slots,
said fold-over bar resting on a cross bar at the leading side of the loaf and holding an intermediate portion of the wrapper sheet thereto after the bar is rocked forwardly,
first end wrap folder elements swingably mounted over the off-feed end of said third conveyor and driven in timed relation to fold in the wrapper sheet on each loaf,
said cam means actuating said retaining fingers being shaped to retract the fingers as said first folder elements move inwardly,
second folder elements swingable in wrapper folding action after said first folder elements,
a horizontal bottom fold plate positioned adjacent the downwardly moving end of said third conveyor to strip the leading end of said wrapper sheets from under said fold-over bars and fold the leading end of the wrapper under each loaf and support the loaf from the end of the third conveyor,
and an end wrap folding and sealing way receiving loaves from said third conveyor including an overhead conveyor engageable with individual loaves to move the loaves over said plate.

3. A wrapping machine for sliced bread comprising:
a first conveyor adapted to receive loaves of sliced bread from a slicer and advance the loaves in spaced side by side relation,
a forwarding plate positioned to receive loaves from said first conveyor and having an overhead conveyor positioned over the plate and driven at the same speed as said first conveyor to continue the advance of said loaves,
a wrapper feeder and cutter positioned under said first conveyor and said forwarding plate,
a wrapper sheet delivery lip inclined arcuately upwardly at the end of said forwarding plate and terminating just below the plate,
a third conveyor having sets of flight bars spaced and driven in time with said overhead conveyor to separately receive the loaves from said plate,
vacuum chambers longitudinally adjustably mounted on the ends of one flight bar of each set of bars with suction ports opening outwardly of said third conveyor,
disks rotating with said third conveyor and having suction passages registering with said chambers on the upwardly rotating end of said third conveyor,
angularly fixed manifolds longitudinally adjustably mounted in coacting suction connecting relation to said passages in said disks during upwardly rotating motion of said chambers,
means connected to develop suction in said manifolds,
communication between said suction passages and said manifolds terminating when said disks and said ports reach the upper side of said third conveyor,
wrapper sheet grippers carried by said flight bars at the outer sides of said ports and longitudinally adjustable with said vacuum chambers,
cam means adjustable with said manifolds and coacting with said grippers to open the grippers as said vacuum chambers move upwardly and to close the grippers onto said flight bars and the sides of the leading ends of said sheets as said chambers move away from said manifolds,
slice retaining fingers pivoted on the ends of another flight bar of each set ahead of said vacuum chambers and adjustable longitudinally therewith,
other cam means positioned along the top flight of said third conveyor and adjustable with said vacuum chambers in coacting relation with said fingers to raise the fingers into slice retaining engagement with the ends of the loaf on the set of bars,
said third conveyor having a pair of pivot supports advanced therewith at the ends of each set of flight bars,
rocker arms having their intermediate portions pivotally mounted on said pivot supports and advanced therewith in parallel relation to the motion of said third conveyor,
a wrapper sheet foldover bar carried between like ends of opposed rocker arms and biased downwardly in trailing relation at the upwardly moving end of said third conveyor,
vertically reciprocable drive elements at the sides of said third conveyor having laterally facing horizontal slots therein,
actuating follower roll elements on the other ends of said rocker arms receivable in said slots by advancing motion of said third conveyor,
drive means timed with said third conveyor and connected to lower then raise said drive elements as said follower elements are advanced through said slots,
said foldover bar resting on a cross bar at the leading side of the loaf and holding an intermediate portion of the wrapper sheet thereto after the bar is rocked forwardly,
first end wrap folder elements laterally swingably mounted over the off-feed end of said third conveyor and driven in timed relation to fold in the back side of the wrapper sheet on each loaf,
said cam means actuating said retaining fingers being shaped to retract the fingers after said first folder elements have moved inwardly,
second top folder elements swingable downwardly in wrapper folding action after said first folder elements,
a horizontal bottom fold plate reciprocable toward the downwardly moving end of said third conveyor to strip the leading end of said wrapper sheets from under said foldover bars and fold the leading end of the wrapper under each loaf and support the loaf from the end of the third conveyor,
and an end wrap folding and sealing away receiving loaves from said third conveyor including an overhead conveyor engageable with individual loaves to move the loaves over said plate.

4. A wrapping machine for sliced bread comprising:
a first conveyor adapted to receive loaves of sliced bread from a slicer and advance the loaves in spaced side by side relation,
a forwarding plate positioned to receive loaves from said first conveyor and having an overhead conveyor positioned over the platform and driven at the same speed as said first conveyor to continue the advance of said loaves,
a wrapper feeder and cutter positioned under said first conveyor and said forwarding plate,
a wrapper sheet delivery lip inclined arcuately upwardly at the end of said forwarding plate and terminating just below the plate,
a third conveyor having sets of flight bars spaced and driven in time with said overhead conveyor to separately receive the loaves from said plate,
vacuum chambers mounted on the ends of one flight bar of each set of bars with suction ports opening outwardly of said third conveyor, disks rotating with said third conveyor and having suction passages registering with said chambers on the upwardly rotating end of said third conveyor,
angularly fixed manifolds mounted in coacting suction connecting relation to said passages in said disks during upwardly rotating motion of said chambers,
means connected to develop suction in said manifolds,
communication between said suction passages and said manifolds terminating when said disks and said ports reach the upper side of said third conveyor,
wrapper sheet grippers carried by said flight bars at the outer sides of said ports,
cam means coacting with said grippers to open the grippers as said vacuum chambers move upwardly and to close the grippers onto said flight bars and the sides of the leading ends of said sheets as said chambers move away from said manifolds,
slice retaining fingers pivoted on the ends of another flight bar of each set ahead of said vacuum chambers,
other cam means positioned along the top flight of said third conveyor in coacting relation with said fingers to raise the fingers into slice retaining engagement with the ends of the loaf on the set of bars,
said third conveyor having a pair of pivot supports advanced therewith at the ends of each set of flight bars,
rocker arms having their intermediate portions pivotally mounted on said pivot supports and advanced therewith in parallel relation to the motion of said third conveyor,
a wrapper sheet foldover bar carried between like ends of opposed rocker arms and biased downwardly in trailing relation at the upwardly moving end of said third conveyor,
vertically reciprocable drive elements at the sides of said third conveyor having laterally facing horizontal slots therein,
actuating follower roll elements on the other ends of said rocker arms receivable in said slots by advancing motion of said third conveyor,
drive means timed with said third conveyor and connected to lower then raise said drive elements as said follower elements are advanced through said slots,
said foldover bar resting on a cross bar at the leading side of the loaf and holding an intermediate portion of the wrapper sheet thereto after the bar is rocked forwardly,
first end wrap folder elements swingably mounted over the off-feed end of said third conveyor and driven in timed relation to fold in the ends of the wrapper sheet on each loaf,
said cam means actuating said retaining fingers being shaped to retract the fingers after said first folder elements have moved inwardly,
second folder elements swingable in wrapper folding action after said first folder elements,
a horizontal bottom fold plate reciprocable toward the downwardly moving end of said third conveyor to strip the leading end of said wrapper sheet from under said foldover bars and fold the leading end of the wrapper under each loaf and support the loaf from the end of the third conveyor,
and an end wrap folding and sealing way receiving loaves from said third conveyor including a conveyor engageable with individual loaves to move the loaves over said plate.

5. A wrapping machine for sliced bread comprising,
a first conveyor adapted to receive loaves of sliced bread from a slicer and advance the loaves in spaced side by side relation,
a forwarding plate positioned to receive loaves from said first conveyor and having a second conveyor positioned over the plate and driven at the same speed as said first conveyor to continue the advance of said loaves,
a wrapper feeder and cutter positioned under said first conveyor and said forwarding plate,
a wrapper sheet delivery lip inclined upwardly at the end of said forwarding plate and terminating just below the plate,
a third conveyor having flights spaced and driven in time with said second conveyor to separately receive the loaves from said plate,
vacuum chambers longitudinally adjustably mounted on the ends of said flights with suction ports opening outwardly of said third conveyor,
disks rotating with said third conveyor and having suction passages registering with said chambers on the upwardly rotating end of said third conveyor,
angularly fixed manifolds longitudinally adjustably mounted in coacting suction connecting relation to said passages in said disks during upwardly rotating motion of said chambers,
means connected to develop suction in said manifolds whereby suction in said ports attracts the leading edge of a wrapper to said ports and advances the wrapper from said lip,
communication between said suction passages and said manifolds terminating when said disks and said ports reach the upper side of said third conveyor,
wrapper sheet grippers carried by said flights at the outer sides of said ports and longitudinally adjustable with said vacuum chambers,
cam means adjustable with said manifolds and coacting with said grippers to open the grippers as said vacuum chambers move upwardly and to close the grippers onto said flight bars and the sides of the leading ends of said sheet as said chambers move out of communication with said manifolds,
slice retaining fingers pivoted on the ends of said flights ahead of said vacuum chambers and adjustable longitudinally therewith,
other cam means positioned along the top flight of said third conveyor and adjustable with said vacuum chambers in coacting relation with said fingers to raise the fingers into slice retaining engagement with the ends of the loaf on each flight,
said third conveyor having a pair of pivot supports advanced therewith at the ends of each flight,
rocker arms having their intermediate portions pivotally mounted on said pivot supports and advanced therewith in parallel relation to the motion of said third conveyor,
a wrapper sheet foldover bar carried between like ends of opposed rocker arms and biased downwardly in trailing relation at the upwardly moving end of said third conveyor,
oscillatable drive elements at the sides of said third conveyor having slots therein,
actuating follower elements on the other ends of said rocker arms receivable in said slots by advancing motion of said chains,
drive means timed with said third conveyor and connected to oscillate said drive elements as said follower elements are engaged in said slots,
said foldover bars resting on the flights at the leading side of the loaf and holding an intermediate portion of the wrapper sheet thereo after the bar is rocked forwardly,
end wrap folder elements laterally swingably mounted over the off-feed end of said third conveyor and driven in timed relation to fold in the back side of the wrapper sheet on each loaf,
top folder elements swingable downwardly and forwardly in wrapper folding action after said first folder elements,
said cam means actuating said retaining fingers being shaped to retract the fingers as the first of said folder elements move to wrapper folding position, a horizontal bottom fold plate located at the downwardly moving end of said third conveyor to strip the leading end of said wrapper sheets from under said foldover bars and fold the leading end of the wrapper under each loaf and support the loaf from the end of the third conveyor, and an end wrap folding and sealing way receiving loaves from said third conveyor including an overhead conveyor engageable with individual loaves to move the loaves over said plate.

6. A wrapping machine for sliced bread comprising:

a first conveyor adapted to receive loaves of sliced bread from a slicer and advance the loaves in spaced side by side relation, a forwarding plate positioned to receive loaves from said first conveyor and having a second conveyor positioned over the plate and driven at the same speed as said first conveyor to continue the advance of said loaves, a wrapper feeder and cutter positioned under said first conveyor and said forwarding plate, a wrapper sheet delivery lip inclined upwardly at the end of said forwarding plate and terminating just below the plate, a third conveyor having flights spaced and driven in time with said second conveyor to separately receive the loaves from said plate, vacuum chambers mounted on the ends of said flights with suction ports opening outwardly of said third conveyor, disks rotating with said third conveyor and having suction passages registering with said chambers on the upwardly rotating end of said third conveyor, angularly fixed manifolds mounted in coacting suction connecting relation to said passages in said disks during upwardly rotating motion of said chambers, means connected to develop suction in said manifolds whereby suction in said ports attracts the leading edge of a wrapper to said ports and advances the wrapper from said lip, communication between said suction passages and said manifolds terminating when said disks and said ports reach the upper side of said third conveyor, wrapper sheet grippers carried by said flights at the outer sides of said ports, cam means coacting with said grippers to open the grippers as said vacuum chambers move upwardly and close the grippers onto said flights at the sides of the leading ends of said sheets as said chambers move out of communication with said manifolds, slice retaining fingers pivoted on the ends of said flights ahead of said vacuum chambers, other cam means positioned along the top flight of said third conveyor in coacting relation with said fingers to raise the fingers into slice retaining engagement with the ends of the loaf on each flight, said third conveyor having a pair of pivot supports advanced therewith at the ends of each flight, rocker arms having their intermediate portions pivotally mounted on said pivot supports and advanced therewith in parallel relation to the motion of said third conveyor, a wrapper sheet foldover bar carried between like ends of opposed rocker arms and biased downwardly in trailing relation at the upwardly moving end of said third conveyor, oscillatable drive elements at the sides of said third conveyor having slots therein, actuating follower elements on the other ends of said rocker arms receivable in said slots by advancing motion of said chains, drive means timed with said third conveyor and connected to oscillate said drive elements as said follower elements are engaged in said slots, said foldover bars resting on the flights at the leading side of the loaf and holding an intermediate portion of the wrapper sheet thereto after the bar is rocked forwardly, end wrap folder elements laterally swingably mounted over the off-feed end of said third conveyor and driven in timed relation to fold in the back side of the wrapper sheet on each loaf, top folder elements swingable downwardly and forwardly in wrapper folding action, said cam means actuating said retaining fingers being shaped to retract the fingers as the first of said folder elements move to wrapper folding position, a horizontal bottom fold plate located at the downwardly moving end of said third conveyor to strip the leading end of said wrapper sheets from under said foldover bars and fold the leading end of the wrapper under each loaf and support the loaf from the end of the third conveyor, and an end wrap folding and sealing way receiving loaves from said third conveyor.

7. A wrapping machine for sliced bread comprising:

a first conveyor adapted to receive loaves of sliced bread and advance the loaves in spaced side by side relation over a forwarding plate, a wrapper feeder and cutter positioned under said first conveyor and said forwarding plate, a wrapper sheet delivery lip inclined upwardly at the end of said forwarding plate and terminating just below the plate, a second conveyor having flights spaced and driven in time with said first conveyor to separately receive the loaves from said plate, vacuum chambers mounted on the ends of each flight with suction ports opening outwardly of said second conveyor, disks rotating with said second conveyor and having suction passages registering with said chambers on the upwardly rotating end of said second conveyor, angularly fixed manifolds mounted in coacting suction connecting relation to said passages in said disks during upwardly rotating motion of said chambers, means connected to develop suction in said manifolds whereby suction in said ports attracts the leading edge of a wrapper to said suction ports and advances the wrapper from said lip, wrapper sheet grippers carried by said flights at the outer sides of said ports, cam means coacting with said grippers to open the grippers as said vacuum chambers move upwardly and to close the grippers onto said flight bars and the sides of the leading ends of said sheets as said chambers move away from said manifolds, slice retaining fingers pivoted on the ends of said flights ahead of said grippers, other cam means positioned along the top flight of said second conveyor in coacting relation with said fingers to raise the fingers into slice retaining engagement with the ends of the loaf on each flight, said second conveyor having a pair of pivot supports advanced therewith at the ends of each flight, rocker arms having their intermediate portions pivotally mounted on said pivot supports and advanced therewith in parallel relation to the motion of said second conveyor, a wrapper sheet foldover bar carried between the ends of opposed rocker arms and biased downwardly in trailing relation at the upwardly moving end of said second conveyor, oscillatable drive elements at the sides of said second conveyor having slots therein, actuating follower elements on the other ends of said rocker arms receivable in said slots by advancing motion of said arms, drive means timed with said second conveyor and connected to oscillate said drive elements as said follower elements are engaged in said slots to rock the bars forwardly, said foldover bars resting on the flights at the leading side of the loaf and holding an intermediate portion of the wrapper sheet thereto after the bar is rocked forwardly, end wrap folder elements swingably mounted over the off-feed end of said third conveyor and driven in timed relation to fold in one side of the wrapper sheet on each loaf, said cam means actuating said retaining fingers being shaped to retract the fingers as said first folder elements move inwardly, other folder elements swingable in wrapper folding action after said first folder elements, a horizontal bottom fold plate positioned adjacent the downwardly moving end of said second conveyor to strip the leading end of said wrapper sheets from under said foldover bars and fold the leading end of the wrapper under each loaf and support the loaf from the end of the third conveyor, and an end wrap folding and sealing way receiving loaves from said second conveyor and engageable with individual loaves to move the loaves over said last plate.

8. A wrapping machine for sliced bread comprising:

a first conveyor adapted to receive loaves of sliced bread and advance the loaves in spaced side by side relation over a forwarding plate, a wrapper feeder and cutter positioned under said first conveyor and said forwarding plate, a wrapper sheet delivery lip inclined upwardly at the end of said forwarding plate and terminating just below the plate, a second conveyor having flights spaced and driven in time with said first conveyor to separately receive the loaves from said plate, wrapper sheet grippers carried by said flights at the outer sides thereof, cam means coacting with said grippers to open the grippers as said flights move upwardly and to close the grippers onto said flight bars and the sides of the leading ends of said sheets as said flights move forwardly, slice retaining fingers pivoted on the ends of said flights ahead of said grippers, other cam means positioned along the top flight of said second conveyor in coacting relation with said fingers to raise the fingers into slice retaining engagement with the ends of the loaf on each flight, said second conveyor having a pair of pivot supports advanced therewith at the ends of each flight, rocker arms pivotally mounted on said pivot supports and advanced therewith in parallel relation to the motion of said second conveyor, a wrapper sheet foldover bar carried between the ends of opposed rocker arms and biased downwardly in trailing relation at the upwardly moving end of said second conveyor, oscillatable drive elements at the sides of said second conveyor having slots therein, actuatng follower elements on said rocker arms receiveable in said slots by advancing motion of said arms, drive means timed with said second conveyor and connected to oscillate said drive elements as said follower elements are engaged in said slots to rock the bars forwardly, said foldover bars resting on the flights at the leading side of the loaf and holding an intermediate portion of the wrapper sheet thereto after the bar is rocked forwardly, end wrap folder elements swingably mounted over the off-feed end of said third conveyor and driven in timed relation to fold in one sde of the wrapper sheet on each loaf, said cam means actuating said retaining fingers being shaped to retract the fingers as said first folder elements move inwardly, other folder elements swingable in wrapper folding action after said first folder elements, a horizontal bottom fold plate positioned adjacent the downwardly moving end of said second conveyor to strip the leading end of said wrapper sheets from under said foldover bars and fold the leading end of the wrapper under each loaf and support the loaf from the end of the third conveyor, and an end wrap folding and sealing way receiving loaves from said second conveyor and engageable with individual loaves to move the loaves over said last plate,

9. In a bread wrapping machine for sliced loaves of bread, a conveyor having spaced drive chains trained over sprockets on a drive shaft and an idler shaft, loaf receiving flights including sets of plural cross bars connected to said chains, blocks longitudinally movably supported toward the ends of one bar of each flight and defining suction chambers with outwardly opening suction ports and inwardly opening vacuum connections communicating therewith, wrapper sheet grippers pivotally mounted on the outer ends of said block and spring biased into lapped gripping relation to the outer sides of said blocks, gripper actuating bar elements horizontally reciprocably mounted on said blocks and projecting into notches in the under sides thereof, cam rails laterally reciprocably mounted between said shafts and having edges laterally drivingly engaged with said blocks, screws having oppositely threaded ends engaged with said rails to spread or converge said rails, sleeves drivingly connected to the shaft at the receiving end of said conveyor and slidable therealong, means forming a non-rotatable laterally sliding driving engagement between said rails and said sleeves, first arcuate cam means connected to the rails and surrounding said sleeves in the path of the gripper actuating elements to open said grippers on the upwardly moving end of said conveyor and then release the actuating elements to close the grippers, second cam means connected to said rails toward the other end of said conveyor and engageable with said actuating elements to open said grippers before and along the downwardly moving end of said conveyor, rotating parts drivingly connected to said sleeves to rotate with said one shaft and adjust laterally with said rails, said rotating parts having suction passages formed therein with yieldable peripheral end seals registering with the vacuum connections of successive blocks rotated therearound, manifold means non-rotatably connected to said rails and embracing said sleeves and one shaft, spring means pressing said manifold means into rotating sealing relation to said rotating parts, said manifold means forming vacuum conducting passages registering with said suction passages in the upwardly and forwardly rotating quadrant of the rotating parts, a non-rotating vacuum supply connection on said manifold means connected to said conducting passages, slice retaining fingers pivotally supported on others of said bars in said flights and ahead of said blocks, finger support members slidably adjustable on said other bars and having notches laterally drivingly engaged with said rails, said fingers being pivoted on said support members and having actuating projections extending therefrom, other cam means carried by said rails and engageable with said projections to swing said fingers upwardly and inwardly of said conveyor at the end thereof after passing the upwardly advancing end and to lower the fingers prior to reaching the downwardly advancing end of the conveyor, means including a wrapper web feed and cut-off and continuously driven belts located at the end of said conveyor to advance the leading ends of wrapper sheets into the path of the upwardly rotating position of said blocks and suction ports, rolling pressure means coacting with said belts to feed said sheets, lift means actuated in timed relation to said conveyor connected to raise said pressure means out of sheet feeding engagement with said belts, means arranged to deliver loaves of sliced bread onto said flights in overlapped relation to said grippers and the leading edges of wrapper sheets held thereby, means including pivot supports advanced at each end of said flights with rocker arms connected to the supports and foldover bars connected between the swinging ends of said arms to trail behind said flights and swing the trailing portion of wrapper sheets over the loaves on the flights, actuating elements vertically reciprocable at the sides of said conveyor and engageable with the other ends of said arms to swing said foldover bars during advancing motion along said conveyor, and means at the advanced end of said conveyor arranged to form end folds in the wrapper sheet and fold the free end of the sheet under the loaf and receive the wrapped loaf from each flight.

10. In a bread wrapping machine for sliced loaves of bread, a conveyor having spaced drive chains trained over sprockets on a drive shaft and an idler shaft, loaf receiving flights including sets of plural cross bars connected to said chains, blocks longitudinally movably supported toward the ends of one bar of each flight and defining suction chambers with outwardly opening suction ports and inwardly opening vacuum connections communicating therewith, wrapper sheet grippers pivotally mounted on the outer ends of said block and spring biased into lapped gripping relation to the outer sides of said blocks, gripper actuating elements movably mounted on said blocks and projecting therefrom, cam rails laterally reciprocably mounted between said shafts and having edges laterally drivingly engaged with said blocks, screws having oppositely threaded ends engaged with said rails to spread or converge said rails, sleeves drivingly connected to the shaft at the receiving end of said conveyor and slidable therealong, means forming a non-rotatable laterally sliding driving engagement between said rails and said sleeves, first arcuate cam means connected to the rails and surrounding said sleeves in the path of the gripper actuating elements to open said grippers on the upwardly moving end of said conveyor and then release the actuating elements to close the grippers, second cam means connected to said rails toward the other end of said conveyor and engageable with said actuating elements to open said grippers before and along the downwardly moving end of said conveyor, rotating parts drivingly connected to rotate with said one shaft and adjust laterally with said rails, said rotating parts having suction passages formed therein with yieldable peripheral end seals registering with the vacuum connections of successive blocks rotated therearound, manifold means non-rotatably connected to said rails and embracing said one shaft, spring means pressing said manifold means into rotating sealing relation to said rotating parts, said manifold means forming vacuum conducting passages registering with said suction passages in the upwardly and forwardly rotating quadrant of the rotating parts, a non-rotating vacuum supply connection on said manifold means connected to said conducting passages, slice retaining fingers pivotally supported on others of said bars in said flights and ahead of said blocks, fiinger support members slidably adjustable on said other bars and laterally drivingly engaged with said rails, said fingers being pivoted on said support members and having actuating projections extending therefrom, other cam means carried by said rails and engageable with said projections to swing said fingers upwardly and inwardly of said conveyor at the end thereof after passing the upwardly advancing end and to lower the fingers prior to reaching the downwardly advancing end of the conveyor, means located at the end of said conveyor to advance the leading ends of wrapper sheets into the path of the upwardly rotating position of said blocks and suction ports, means arranged to deliver loaves of sliced bread onto said flights in overlapped relation to said grippers and the leading edges of wrapper sheets held thereby, means advanced with each of said flights to swing the trailing portion of wrapper sheets over the loaves on the flights during advancing motion along said conveyor, and means at the advanced end of said conveyor arranged to form end folds in the wrapper sheet and fold the free end of the sheet under the loaf and receive the wrapped loaf from each flight.

11. In a bread wrapping machine for sliced loaves of bread, a conveyor having spaced drive chains trained over sprockets on a drive shaft and an idler shaft, loaf receiving flights connected to said chains, blocks longitudinally movably supported toward the ends of each flight intermediate the width of the flight and defining suction chambers with outwardly opening suction ports and inwardly opening vacuum connections communicating therewith, wrapper sheet grippers pivotally mounted on the outer ends of said blocks and spring biased into lapped gripping relation to the outer sides of said blocks, gripper actuating bar elements horizontally reciprocably mounted on said blocks and projecting into notches in the under sides thereof, cam rails laterally reciprocably mounted between said shafts and having edges laterally guidingly engaged with said blocks, screws having oppositely threaded ends engaged with said rails to spread or converge said rails, sleeves drivingly connected to the shaft at the receiving end of said conveyor and slidable therealong, means forming a non-rotatable laterally sliding driving engagement between said rails and said sleeves, first arcuate cam means connected to the rails and surrounding said sleeves in the path of the gripper actuating elements to open said grippers on the upwardly moving end of said conveyor and then release the actuating elements to close the grippers along the advancing part of said conveyor, second cam means connected to said rails toward the other end of said conveyor and engageable with said actuating elements to open said grippers before and along the downwardly moving end of said conveyor,
rotating parts drivingly connected to said sleeves to rotate with said one shaft and adjust laterally with said rails,
said rotating parts having suction passages formed therein with yieldable peripheral end seals registering with the vacuum connections of successive blocks rotated therearound,
manifold means non-rotatably connected to said rails and embracing said sleeves and one shaft,
spring means pressing said manifold means into rotating sealing relation to said rotating parts,
said manifold means forming vacuum conducting passages registering with said suction passages in the upwardly and forwardly rotating quadrant of the rotating parts,
a non-rotating vacuum supply connection on said manifold means connected to said conducting passages,
slice retaining fingers pivotally supported on said flights and ahead of said blocks,
finger support members slidably adjustable on said flights and laterally drivingly engaged with said rails,
said fingers being pivoted on said support members and having actuating projections extending therefrom,
other cam means carried by said rails and engageable with said projections to swing said fingers upwardly and inwardly of said conveyor at the end thereof after passing the upwardly advancing end and to lower the fingers prior to reaching the downwardly advancing end of the conveyor,
means including a wrapper web feed and cut-off and continuously driven belts located at the end of said conveyor to advance the leading ends of wrapper sheets into the path of the upwardly rotating position of said blocks and suction ports,
rolling pressure means coacting with said belts to feed said sheets,
lift means actuated in timed relation to said conveyor connected to raise said pressure means out of sheet feeding engagement with said belts,
means arranged to deliver loaves of sliced bread onto said flights in overlapped relation to the leading edges of wrapper sheets held by said grippers,
means including pivot supports advanced at each end of said flights with rocker arms connected to the supports and fold-over bars connected between the swinging ends of said arms to trail behind said flights and swing the trailing portion of wrapper sheets over the loaves on the flights,
actuating elements horizontally fixedly mounted at the sides of said conveyor and engageable with the said arms to swing said fold-over bars during advancing motion along said conveyor,
and means at the advanced end of said conveyor arranged to form end folds in the wrapper sheet and receive the partially wrapped loaf from each flight.

12. In a bread wrapping machine for sliced loaves of bread,
a conveyor having spaced drive chains trained over sprockets on a drive shaft and an idler shaft,
loaf receiving flights connected to said chains,
blocks supported toward the ends of each flight intermediate the width of the flight and defining suction chambers with outwardly opening suction ports and inwardly opening vacuum connections communicating therewith,
wrapper sheet grippers pivotally mounted on the outer ends of said blocks and swingable into lapped gripping relation to the outer sides of said blocks,
gripper actuating bar elements horizontally reciprocably mounted on said blocks and projecting into notches in the under sides thereof,
cam rails mounted between said shafts,
first arcuate cam means positioned in the path of the gripper actuating elements to open said grippers on the upwardly moving end of said conveyor and then permit closing of the grippers along the advancing part of said conveyor,
means connected to close said grippers along said advancing part,
second cam means positioned toward the other end of said conveyor and engageable with said actuating elements to open said grippers before and along the downwardly moving end of said conveyor,
rotating parts drivingly connected to rotate with said one shaft,
said rotating parts having suction passages formed therein registering with the vacuum connections of successive blocks rotated therearound,
manifold means non-rotatably embracing said one shaft,
spring means pressing said manifold means into rotating sealing relation to said rotating parts,
said manifold means forming vacuum conducting passages registering with said suction passages in the upwardly and forwardly rotating quadrant of the rotating parts,
a non-rotating vacuum supply connection on said manifold means connected to said conducting passages,
slice retaining fingers pivotally supported on said flights and ahead of said blocks,
finger support members on said flights,
said fingers being pivoted on said support members and having actuating projections extending therefrom,
other cam means carried by said rails and engageable with said projections to swing said fingers upwardly and inwardly of said conveyor at the end thereof after passing the upwardly advancing end and to lower the fingers prior to reaching the downwardly advancing end of the conveyor,
means including a wrapper web feed and cut-off located at the end of said conveyor to advance the leading ends of the wrapper sheets into the path of the upwardly rotating position of said blocks and suction ports,
means arranged to deliver loaves of sliced bread onto said flights in overlapped relation to the leading edges of wrapper sheets held by said grippers,
means including pivot supports advanced at each end of said flights with rocker arms connected to the supports and fold-over bars connected between the swinging ends of said arms to trail behind said flights and swing the trailing portion of wrapper sheets over the loaves on the flights,
actuating elements horizontally fixedly mounted at the sides of said conveyor and engageable with the said arms to swing said fold-over bars during advancing motion along said conveyor,
and means at the advanced end of said conveyor arranged to form end folds in the wrapper sheet and receive the partially wrapped load from each flight.

13. In a bread wrapping machine for sliced loaves of bread,
a conveyor having spaced drive chains trained over sprockets on a drive shaft and an idler shaft,
loaf receiving flights including sets of plural cross bars connected to said chains,
blocks supported toward the ends of an intermediate bar of each flight and defining suction chambers with outwardly opening suction ports and inwardly opening vacuum connections communicating therewith,
wrapper sheet grippers pivotally mounted on the outer ends of each block and spring biased inwardly into lapped gripping relation to the outer sides of said blocks,
gripper actuating bar elements horizontally reciprocably mounted on said blocks and projecting into notches in the under sides thereof,
cam rails mounted between said shafts and having edges guidingly engaged with said blocks, first arcuate cam means connected to the rails in the path of the gripper actuating elements to open said grippers on the upwardly moving end of said conveyor and then release the actuating elements to close the grippers along the advancing part of said conveyor, second cam means connected to said rails toward the other end of said conveyor and engageable with said actuating elements to open said grippers before and along the downwardly moving end of said conveyor, rotating parts drivingly connected to rotate with said one shaft, said rotating parts having suction passages formed therein with yieldable peripheral end seals registering with the vacuum connections of successive blocks rotated therearound, manifold means non-rotatably connected to said rails and embracing said one shaft, spring means pressing said manifold means into rotating sealing relation to said rotating parts, said manifold means forming vacuum conducting passages registering with said suction passages in the upwardly and forwardly rotating quadrant of the rotating parts, a non-rotating vacuum supply connection on said manifold means connected to said conducting passages, slice retaining fingers pivotally supported on others of said bars in said flights and ahead of said blocks, said fingers having actuating projections extending therefrom, other cam means carried by said rails and engageable with said projections to swing said fingers upwardly and inwardly of said conveyor at the end thereof after passing the upwardly advancing end and to lower the fingers prior to reaching the downwardly advancing end of the conveyor, means including a wrapper web feed and cut-off and continuously driven belts located at the end of said conveyor to advance the leading ends of wrapper sheets into the path of the upwardly rotating position of said blocks and suction ports, rolling pressure means coacting with said belts to feed said sheets, lift means actuated in timed relation to said conveyor connected to raise said pressure means out of sheet feeding engagement with said belts, means arranged to deliver loaves of sliced bread onto said flights in overlapped relation to said grippers and the leading edges of wrapper sheets held thereby, means including pivot supports advanced at each end of said flights with rocker arms connected to the supports and foldover bars connected between the swinging ends of said arms to trail behind said flights and swing the trailing portion of wrapper sheets over the loaves on the flights, actuating elements vertically reciprocable at the sides of said conveyor and engageable with said arms to swing said foldover bars during advancing motion with said conveyor, and means at the advanced end of said conveyor arranged to form end folds in the wrapper sheet and fold the free end of the sheet under the loaf and receive the wrapped loaf from each flight.

14. In a bread wrapping machine for sliced loaves of bread, a conveyor having spaced drive chains trained over sprockets on a drive shaft and an idler shaft, loaf receiving flights including sets of plural cross bars connected to said chains, blocks supported toward the end of an intermediate bar of each flight and defining suction chambers with outwardly opening suction ports and inwardly opening vacuum connections communicating therewith, wrapper sheet grippers pivotally mounted on the outer ends of each block and movable inwardly into lapped gripping relation to the outer sides of said blocks, gripper actuating bar elements horizontally reciprocably mounted on said blocks and projecting into notches in the under sides thereof, cam rails mounted between said shafts and having edges guidingly engaged with said blocks, first arcuate cam means connected to the rails in the path of the gripper actuating elements to open said grippers on the upwardly moving end of said conveyor and permit the closing of the grippers along the advancing part of said conveyor, means connected to close said grippers along said advancing part, second cam means connected to said rails toward the other end of said conveyor and engageable with said actuating elements to open said grippers before and along the downwardly moving end of said coveyor, rotating parts drivingly connected to rotate with said one shaft, said rotating parts having suction passages formed therein with yieldable peripheral end seals registering with the vacuum connections of successive blocks rotated therearound, manifold means non-rotatably supported adjacent and embracing said one shaft, spring means pressing said manifold means into rotating sealing relation to said rotating parts, said manifold means forming vacuum conducting passages registering with said suction passages in the upwardly and forwardly rotating quadrant of the rotating parts, a non-rotating vacuum supply connection on said manifold means connected to said conducting passages, slice retaining fingers pivotally supported on others of said bars in said flights and ahead of said blocks, said fingers having actuating projections extending therefrom, other cam means carried by said rails and engageable with said projections to swing said fingers upwardly and inwardly of said conveyor at the end thereof after passing the upwardly advancing end and to lower the fingers prior to reaching the downwardly advancing end of the conveyor, means including a wrapper web feed and cut-off and continuously driven belts located at the end of said conveyor to advance the leading ends of wrapper sheets into the path of the upwardly rotating position of said blocks and suction ports, rolling pressure means coacting with said belts to feed said sheets, lift means actuated in timed relation to said conveyor connected to raise said pressure means out of sheet feeding engagement with said belts, means arranged to deliver loaves of sliced bread onto said flights in overlapped relation to said grippers and the leading edges of wrapper sheets held thereby, means including pivot supports advance at each end of said flights with rocker arms connected to the supports and foldover bars connected between the swinging ends of said arms to trail behind said flights and swing the trailing portion of wrapper sheets over the loaves on the flights, actuating elements vertically reciprocable at the sides of said conveyor and engageable with said arms to swing said foldover bars during advancing motion with said conveyor, and means at the advanced end of said conveyor arranged to form end folds in the wrapper sheet and receive the wrapped loaf from each flight.

15. A wrapping machine for sliced bread comprising, a first conveyor adapted to receive loaves of sliced bread and advance the loaves in spaced side by side relation,
a forwarding plate positioned to support loaves along said first conveyor,
a wrapper feeder and cutter positioned under said first conveyor and said forwarding plate,
a wrapper sheet delivery lip inclined upwardly at the end of a delivery plate and terminating just below the forwarding plate,
a second conveyor having flights driven in time with said first conveyor to separately receive the loaves from said forwarding plate,
vacuum chambers mounted on the ends of said flights with suction ports opening outwardly of said second conveyor,
parts rotating with said second conveyor and having suction passages registering with said chambers on the upwardly rotating end of said second conveyor,
angularly fixed manifolds mounted in coacting suction connecting relation to said passages in said parts during upwardly rotating motion of said chambers,
means connected to develop suction in said manifolds whereby suction in said ports attracts the leading edge of a wrapper to said suction ports and advances the wrapper from said lip,
wrapper sheet grippers carried by said flights at the outer sides of said ports,
cam means coacting with said grippers to open the grippers as said vacuum chambers move upwardly and to close the grippers onto said flights and the sides of the leading ends of said sheets as said chambers move away from said manifolds,
slice retaining fingers pivoted on the ends of said flights ahead of said vacuum chambers,
other cam means positioned along the top flight of said second conveyor in coacting relation with said fingers to raise the fingers into slice retaining engagement with the ends of the loaf on each flight,
means carried by said second conveyor and operative to partially fold said sheets around the loaves on said flights,
actuating means positioned along said second conveyor and timed with said second conveyor and connected to activate said folding means carried by the second conveyor,
and end wrap folder elements swingably mounted over the off-feed end of said third conveyor and driven in timed relation to fold in the wrapper sheet on each loaf,
said cam means and said other cam means having portions actuating said retaining fingers and said grippers to retracted positions as said folder elements move to actuated position.

16. A wrapping machine for sliced bread comprising:
a first conveyor adapted to receive loaves of sliced bread and advance the loaves in spaced side by side relation,
a forwarding plate positioned to support loaves along said first conveyor,
a wrapper feeder and cutter positioned under said first conveyor and said forwarding plate,
a wrapper sheet delivery lip inclined upwardly at the end of a delivery plate and terminating just below the forwarding plate,
a second conveyor having flights driven in time with said first conveyor to separately receive the loaves from said forwarding plate,
vacuum chambers mounted on the ends of said flights with suction ports opening outwardly of said second conveyor,
parts having suction passages registering with said chambers on the upwardly rotating end of said second conveyor,
means connected to develop suction in said parts whereby suction in said ports attracts the leading edge of a wrapper to said suction ports and advances the wrapper from said lip,
wrapper sheet grippers carried by said flights at the outer sides of said ports,
cam means coacting with said grippers to open the grippers as said vacuum chambers move upwardly and to close the grippers onto said flights and the sides of the leading ends of said sheets as said chambers move away from said manifolds,
slice retaining fingers pivoted on the ends of said flights ahead of said vacuum chambers,
other cam means positioned along the top flight of said second conveyor in coacting relation with said fingers to raise the fingers into slice retaining engagement with the ends of the loaf on each flight,
means carried by said second conveyor and operative to partially fold said sheets around the loaves on said flights,
actuating means positioned along said second conveyor and timed with said second conveyor and connected to activate said folding means carried by the second conveyor,
and end wrap folder elements swingably mounted over the off-feed end of said second conveyor and driven in timed relation to fold in the wrapper sheet on each loaf,
said cam means and said other cam means having portions actuating said retaining fingers and said grippers to retracted positions as said folder elements move to actuated positions.

17. In a wrapping machine for sliced loaves of bread,
a conveyor having flights adapted to receive and advance said loaves along an upper reach of said conveyor,
gripper means at each end of said flights adapted to grip the sides of the leading end of a wrapper sheet intermediate of the advancing width of the flight,
slice holding fingers pivoted on said flights and swingable upwardly and laterally inwardly thereon ahead of said gripper means,
means arranged to deliver wrapper sheets to said gripper means at the receiving end of said conveyor and to thereafter deliver a loaf of sliced bread to the flight associated with the gripper in overlapped relation to the leading end of the sheet,
means acting in response to forward movement of the flight to move said fingers to slice holding position as the loaf is deposited on the flight,
a fold over bar carried by said conveyor in trailing relation to each flight as the flight advances to the receiving end of the conveyor,
means coacting with each successive bar to move the bar up and over each flight and a loaf thereon to rest on the flight ahead of the loaf as the flight advances,
means located over the discharge end of said conveyor and movable into wrapper folding and slice retaining position as each loaf moves therebetween,
means coacting with said fingers to retract the fingers as said wrapper folding means move to operative position,
means engageable with said gripper means to release the means engaging the leading end of the sheet as the sheet approaches the discharge end of the conveyor,
a bottom fold and transfer plate reciprocable longitudinally at the discharge end of the conveyor and at about the level of said flights to receive and support loaves from each flight and fold the overfolded end of each wrapper sheet under each advancing loaf,
and an end fold forming and sealing conveyor positioned to advance loaves from said first conveyor and advance them over said transfer plate.

18. In a wrapping machine for sliced loaves of bread,
a conveyor having flights adapted to receive and advance said loaves along an upper reach of said conveyor,
gripper means at each end of said flights adapted to grip the leading end of a wrapper sheet intermediate of the advancing width of the flight,
slice holding fingers on said flights and movable upwardly thereon ahead of said gripper means,
means arranged to deliver wrapper sheets to said gripper means at the receiving end of said conveyor and to thereafter deliver a loaf of sliced bread to the flight associated with the gripper in overlapped relation to the sheet,
means acting in response to forward movement of the flight to move said fingers to slice holding position as the loaf is deposited on the flight,
a foldover bar carried by said conveyor in trailing relation to each flight as the flight advances to the receiving end of the conveyor,
means coacting with each successive bar to move the bar up and over each flight and a loaf thereon to rest on the flight ahead of the loaf as the flight advances,
means located over the discharge end of said conveyor and movable into wrapper folding and slice retaining position as each loaf moves therebetween,
means coacting with said fingers to retract the fingers as said wrapper folding means move to operative position,
means engageable with said gripper means to release the means engaging the leading end of the sheet as the sheet approaches the discharge end of the conveyor,
a bottom fold and transfer plate at the discharge end of the conveyor and at about the level of said flights to receive and support loaves from each flight and fold the overfolded end of each wrapper sheet under each advancing loaf,
and an end fold forming and sealing conveyor positioned to advance loaves from said first conveyor and advance them over said transfer plate.

19. In a wrapping machine for sliced loaves of bread,
a conveyor having flights adapted to receive and advance said loaves along an upper reach of said conveyor,
gripper means carried by said flights adapted to grip the leading end of a wrapper sheet intermediate of the advancing width of the flight,
slice holding fingers on said flights and movable upwardly thereon ahead of said gripper means,
means arranged to deliver wrapper sheets to said gripper means at the receiving end of said conveyor and to thereafter deliver a loaf of sliced bread to the flight in over-lapped relation to the sheet,
means acting in response to forward movement of the flight to move said fingers to slice holding position as the loaf is deposited on the flight,
a foldover bar carried by said conveyor in trailing relation to each flight as the flight advances to the receiving end of the conveyor,
means coacting with each successive bar to move the bar up and over each flight and a loaf thereon to rest on the flight ahead of the loaf as the flight advances,
means located over the discharge end of said conveyor and movable into wrapper folding and slice retaining position as each loaf moves therebetween,
means coacting with said fingers to retract the fingers as said wrapper folding means move to operative position,
means engageable with said gripper means to release the gripper means as the sheet approaches the discharge end of the conveyor,
a bottom fold and transfer plate at the discharge end of the conveyor and at about the level of said flights to receive and support loaves from each flight and fold the overfolded end of each wrapper sheet under each advancing loaf,
and an end fold forming and sealing conveyor positioned to advance loaves from said first conveyor and advance them over said transfer plate.

20. In a wrapping machine for sliced loaves of bread,
a conveyor having flights adapted to receive and advance said loaves along an upper reach of said conveyor,
gripper means carried by said flights adapted to grip the leading end of a wrapper sheet,
slice holding fingers on said flights and movable upwardly thereon,
means arranged to deliver wrapper sheets to said gripper means at the receiving end of said conveyor and to thereafter deliver a loaf of sliced bread to the flight in over-lapped relation to the sheet,
means acting in response to forward movement of the flight to move said fingers to slice holding position as the loaf is deposited on the flight,
a foldover bar carried by said conveyor in adjacent relation to each flight as the flight advances to the receiving end of the conveyor,
means coacting with each successive bar to move the bar up and over each flight and a loaf thereon to rest on the flight alongside the loaf as the flight advances,
means located over the discharge end of said conveyor and movable into wrapper folding and slice retaining position as each loaf moves therebetween,
means coacting with said fingers to retract the fingers as said wrapper folding means move to operative position,
means engageable with said gripper means to release the gripper means after the loaf has been deposited on the conveyor,
and an end fold forming and sealing conveyor positioned to advance loaves from said first conveyor and advance them over said transfer plate.

21. In a wrapping machine,
a conveyor having flights adapted to support articles to be wrapped along a forwarding reach of the conveyor,
grippers carried by said flights between the front and rear sides thereof and adjustable laterally of the flights,
fixed cam means extending along said conveyor and coacting with said grippers to open and close the grippers adjacent the rear end of the conveyor to grip the sides of the leading end of a sheet of wrapper material,
vacuum pick-up means carried by said flights with suction ports opening to the surface thereof,
means for connecting a vacuum to said pick-up means while said grippers are open at the rear end of the conveyor,
said cam means having a portion arranged to open said grippers toward the front end of the conveyor,
means driven in timed relation to said conveyor and arranged to deliver a sheet of wrapping material with its leading end in the path of said vacuum pick-up and said grippers,
foldover bars swingably mounted on said conveyor and advanced in trailing relation to each flight at the rear end of the conveyor,
means positioned alongside the advancing reach of said conveyor and cooperative with said foldover bars to swing the bars and a wrapper sheet over their associated flights into wrapper retaining engagement with the leading sides of the flights as the conveyor advances,
and a transfer plate reciprocably mounted in clearing relation to said flights and grippers ahead of the folded over position of said foldover bars to intercept the folded over portion of the wrappers and fold it under articles on said flights and separate the articles and wrappers from the flights, said transfer plate being drivingly connected to said conveyor to retract toward said conveyor as each flight approaches the plate.

22. In a wrapping machine, a conveyor having flights adapted to support articles to be wrapped along a forwarding reach of the conveyor, grippers carried by said flights and adjustable laterally of the flights, fixed cam means extending along said conveyor and coacting with said grippers to open and close the grippers adjacent the rear end of the conveyor to grip the leading end of a sheet of wrapper material, vacuum pick-up means carried by said flights with suction ports opening to the surface thereof, means for connecting a vacuum to said pick-up means while said grippers are open at the rear end of the conveyor, said cam means having a portion arranged to open said grippers toward the front end of the conveyors, means driven in timed relation to said conveyor and arranged to deliver a sheet of wrapping material with its leading end in the path of said grippers, foldover bars swingably mounted on said conveyor and advanced in trailing relation to each flight at the rear end of the conveyor, means positioned alongside the advancing reach of said conveyor and cooperative with said foldover bars to swing the bars and a wrapper sheet over their associated flights into wrapper retaining engagement with the leading sides of the flights as the conveyor advances, and a transfer plate mounted in clearing relation to said flights and grippers ahead of the folded over position of said foldover bars to intercept the folded over portion of the wrappers and fold it under articles on said flights and separate the articles and wrappers from the flights.

23. In a wrapping machine, a conveyor having flights adapted to support articles to be wrapped along a forwarding reach of the conveyor, grippers carried by said flights, fixed cam means extending along said conveyor and coacting with said grippers to open and close the grippers adjacent the rear end of the conveyor to grip the leading end of a sheet of wrapper material, vacuum pick-up means carried by said flights with suction ports opening to the surface thereof, means for connecting a vacuum to said pick-up means while said grippers are open at the rear end of the conveyor, said cam means having a portion arranged to open said grippers toward the front end of the conveyor, means driven in timed relation to said conveyor and arranged to deliver a sheet of wrapping material with its leading end in the path of said grippers, foldover bars swingably mounted on said conveyor and advanced in trailing relation to each flight at the rear end of the conveyor, means positioned alongside the advancing reach of said conveyor and cooperative with said foldover bars to swing the bars and a wrapper sheet over their associated flights into wrapper retaining engagement with the leading sides of the flights as the conveyor advances, and a transfer plate located at the leading end of said conveyor to intercept the front sides of wrapper sheets folded over articles on said flights and to fold the end of the wrappers under the articles and support the articles after said bars have swung forwardly.

24. In a wrapping machine, a conveyor having flights adapted to support articles to be wrapped along a forwarding reach of the conveyor, grippers carried by said flights, fixed cam means positioned along said conveyor and coacting with said grippers to open and close the grippers adjacent the rear end of the conveyor to grip the leading end of a sheet of wrapper material, said cam means having a portion arranged to open said grippers toward the front end of the conveyor, means driven in timed relation to said conveyor and arranged to deliver a sheet of wrapping material with its leading end in the path of said grippers, foldover bars swingably mounted on said conveyor and advanced in trailing relation to each flight at the rear end of the conveyor, means positioned alongside the advancing reach of said conveyor and cooperative with said foldover bars to swing the bars and a wrapper sheet over their associated flights into wrapper retaining engagement with the leading sides of the flights as the conveyor advances, and a transfer plate located to intercept the front sides of wrapper sheets folded over articles on said flights and to fold the end of the wrapper under the articles and support the articles after said bars have swung forwardly.

25. In a wrapping machine, a conveyor having flights adapted to support articles to be wrapped along a forwarding reach of the conveyor, holding means carried by said flights between the front and rear sides thereof and adjustable laterally of the flights, fixed cam means extending along said conveyor and coacting with said holding means to release and activate the holding means adjacent the rear end of the conveyor to pick up and hold the leading end of a sheet of wrapper material, said cam means having a portion arranged to release said holding means toward the front end of the conveyor, means driven in timed relation to said conveyor and arranged to deliver a sheet of wrapping material with its leading end in the path of each holding means, foldover bars swingably mounted on said conveyor and advanced in trailing relation to each flight at the rear end of the conveyor, means positioned along the advancing reach of said conveyor and cooperative with said foldover bars to swing the bars and a wrapper sheet over their associated flights into wrapper retaining engagement with the leading sides of the flights as the conveyor advances, and a transfer plate reciprocably mounted in clearing relation to said flights and holding means ahead of the folded over position of said foldover bars to intercept the folded over portion of the wrappers and fold it under articles on said flights and separate the articles and wrappers from the flights, said transfer plate being drivingly connected to said conveyor to retract toward said conveyor as each flight approaches the plate.

26. In a wrapping machine, a conveyor having flights adapted to support articles to be wrapped along a forwarding reach of the conveyor, holding means carried by said flights between the front and rear sides thereof, fixed cam means extending along said conveyor and coacting with said holding means to activate the holding means adjacent the rear end of the conveyor to pick up and hold the leading end of a sheet of wrapper material, said cam means having a portion arranged to release said holding means toward the front end of the conveyor, means driven in timed relation to said conveyor and arranged to deliver a sheet of wrapping material with its leading end in the path of said holding means on each flight, foldover bars swingably mounted on said conveyor and advanced in trailing relation to each flight at the rear end of the conveyor, means positioned along the advancing reach of said conveyor and cooperative with said foldover bars to swing the bars and a wrapper sheet over their associated flights into wrapper retaining engagement with the leading sides of the flights as the conveyor advances, and a transfer plate mounted in clearing relation to said flights and holding means ahead of the folded over position of said foldover bars to intercept the folded over portion of the wrappers and fold it under articles on said flights and separate the articles and wrappers from the flights.

27. In a wrapping machine, a conveyor having flights adapted to support articles to be wrapped along a forwarding reach of the conveyor, holding means carried by said flights between the front and rear sides thereof, means arranged to activate the holding means adjacent the rear end of the conveyor to pick-up and advance the leading end of a sheet of wrapper material, means driven in timed relation to said conveyor and arranged to deliver a sheet of wrapping material with its leading end in the path of said holding means on each flight, means driven in timed relation to said conveyor and arranged to deposit articles on said flights and the held portion of said wrapper sheets, fold over bars swingably mounted on said conveyor and advanced in trailing relation to each flight at the rear end of the conveyor, means positioned alongside the advancing reach of said conveyor and cooperative with said fold over bars to swing the bars and a wrapper sheet over their associated flights into wrapper retaining engagement with the leading sides of the flights as the conveyor advances, and a transfer plate mounted in clearing relation to said flights and holding means ahead of the folded over position of said fold over bars to intercept the folded over portion of the wrappers and fold it under articles on said flights and separate the articles and wrappers from the flights.

28. A wrapping machine comprising:

an assembly of conveyors driven in timed relation and characterized by a main wrapping conveyor having article supporting flights with article pusher flights at the back of such supporting flight, a wrapper sheet feed conveyor arranged to advance the leading end of a wrapper sheet to adjacent each supporting flight, gripper means carried by each supporting flight at the sides thereof and operative to grip the leading ends of said sheets, an article feeding conveyor positioned to advance an article to be wrapped onto said supporting flights and the leading end of a wrapper sheet gripped thereon, a plurality of levers pivotally mounted at each end of each of said supporting flights and advanced therewith around said main wrapping conveyor, fold-over bars carried by swinging ends of said levers and extending transversely across the outer sides of said main wrapping conveyor and biased to trailing relation to the supporting flight with which they are associated at the infeeding article receiving end of said main wrapping conveyor, lever actuating means located intermediate the ends of said main wrapping conveyor and engageable with said levers during advancing motion thereof to swing said fold-over bars upwardly under the trailing portions of wrapper sheets gripped to said supporting flights and over the articles thereon into frictional gripping engagement with the leading ends of said supporting flights ahead of the articles thereon, an overhead conveyor overlapping the discharge end of said main wrapping conveyor and having pusher flights timed to push said articles off said supporting flights, a receiving way positioned to receive articles from said main wrapping conveyor and draw the overfolded leading ends of said wrapper sheets from under said fold-over bars and fold said ends into underlapped relation to the leading ends of said articles and the original leading ends of the sheets, means acting to release said gripper means on each supporting flight pior to movement of the overlapped portions of the sheets under the original leading edges of the sheets, and means positioned along said overhead conveyor arranged to form overlapped end folds in the ends of said wrapper sheet in the tubular wrapped condition of the sheet around said articles.

29. A wrapping machine as defined in claim 28 in which said supporting flights have transversely extending fingers pivoted thereon ahead of said grippers, and cam means positioned along the advancing reach of said main wrapping conveyor engageable with projections on said fingers to swing said fingers transversely upwardly and inwardly to retain the ends of articles as they are deposited on said supporting flights and to retract said fingers prior to underlapping motion of said over-folded portions of said sheets under the leading ends of said articles.

30. A wrapping machine as defined in claim 28 in which said main wrapping conveyor has temporary holding means arranged to move and hold the leading edges of said wrapper sheets against said supporting flights prior to and during the movement of said gripping means on each flight into sheet gripping position.

31. A wrapping machine as defined in claim 28 in which said end lap folding means include laterally swingable folders actuated to form forwardly turned trailing end flaps in the tubular wrappers, and stationary folders between which said articles are advanced to form rearwardly turned end flaps in said tubular wrappers after said forwardly turned flaps have been formed.

32. A wrapping machine as defined in claim 31 in which there are vertically swinging folders at the sides of said overhead conveyor arranged to form downwardly turned top end flaps in said tubular wrappers prior to advance of said articles to said stationary folders.

33. A wrapping machine as defined in claim 31 in which said gripper means on said supporting flights and end lap folding means and said stationary folders are adjustable transversely of said main wrapping conveyor to cooperate with articles of different transverse width.

34. A wrapping machine as defined in claim 28 in which said lever actuating means includes vertically reciprocable bars at each side of said main wrapping conveyor and having horizontal slots positioned to receive projections on said levers to swing said levers about their pivots as the levers advance with said main wrapping conveyor.

35. A wrapping machine as defined in claim 28 in which said article feeding conveyor includes a flat way with flights operating thereover to advance articles from the end of said way onto said supporting flights.

No references cited.

FRANK E. BAILEY, *Primary Examiner.*

L. S. BOUCHARD, *Assistant Examiner.*